United States Patent [19]

Revelli, Jr. et al.

[11] Patent Number: 5,371,817
[45] Date of Patent: Dec. 6, 1994

[54] MULTICHANNEL OPTICAL WAVEGUIDE PAGE SCANNER WITH INDIVIDUALLY ADDRESSABLE ELECTRO-OPTIC MODULATORS

[75] Inventors: Joseph F. Revelli, Jr.; Alan C. G. Nutt; Jay S. Schildkraut; Eric J. Lim; David A. Roberts, all of Rochester; David J. Williams, Fairport; Douglas R. Robello, Webster; Thomas L. Penner, Fairport; Sanwal Sarraf, Webster; Chih-Li Chuang, Pittsford, all of N.Y.

[73] Assignee: Eastman Kodak Company, Rochester, N.Y.

[21] Appl. No.: 17,909

[22] Filed: Feb. 16, 1993

[51] Int. Cl.$^5$ .................................... G02B 6/10
[52] U.S. Cl. ............................. 385/44; 385/16
[58] Field of Search ............... 385/7, 10, 16, 31, 33, 385/41-44

[56] References Cited

U.S. PATENT DOCUMENTS

| | | | |
|---|---|---|---|
| 4,367,925 | 1/1983 | Sprague et al. | 350/355 |
| 4,386,827 | 6/1983 | Scifres et al. | 350/356 |
| 4,394,060 | 7/1983 | Verber et al. | 385/7 |
| 4,536,450 | 8/1985 | Garito | 428/411.1 |
| 4,605,869 | 8/1986 | Choe | 307/425 |
| 4,607,095 | 8/1986 | Kuder | 528/337 |
| 4,615,962 | 10/1986 | Garito | 430/20 |
| 4,624,872 | 11/1986 | Stuetz | 428/1 |
| 4,694,066 | 9/1987 | DeMartino et al. | 528/373 |
| 4,765,703 | 8/1988 | Suzuki et al. | 350/96.14 |
| 4,776,661 | 10/1988 | Handa | 350/96.19 |
| 4,900,127 | 2/1990 | Robello et al. | 350/96.34 |
| 4,995,689 | 2/1991 | Sarraf | 385/10 |
| 5,018,813 | 5/1991 | Roddy et al. | 385/16 |
| 5,052,771 | 10/1991 | Williams et al. | 385/8 |
| 5,091,983 | 2/1992 | Lukosz | 385/37 X |

OTHER PUBLICATIONS

T. E. Van Eck et al., *Complimentary Optical Tap Fabricated in an Electro-Optic Polymer Waveguide*, Appl. Phys. Lett., vol. 58, No. 15, Apr. 1991, pp. 1588-1590.
Ulman et al., *New Sulfonyl-Containing Materials for Nonlinear Optics: Semiempirical Calculations, Synthesis and Properties*, Joournal of American Chemical Society, vol. 112 (1990), pp. 7083-7090.
Kubota and Takeda, *Array Illuminator Using Grating Couplers*, Opt. Lett., vol. 14, Jun. 15, 1989, pp. 651-652.
Weller-Brophy and Hall, *Local Normal Mode Analysis of Guided Mode Interactions with Waveguide Gratings*, J. Lightwave Tech., vol. 6, Jun. 1988, pp. 1069-1082.
Williams, *Nonlinear Optical Properties of Guest-Host Polymer Structures*, Quantum Electronics: Principles and Applications, vol. 1 (1987) edited by Chemla & Zyss.
Iga and Misawa, *Distributed-Index Planar Microlens and Stacked Planar Optics: A Review of Progress*, Appl. Optics, vol. 25, No. 19, Oct. 1, 1986, pp. 3388-3396.
T. Findalky, *Glass Waveguides by Ion Exchange: A Review*, Optical Engineering, vol. 24, No. 2, Mar./Apr. 1985, pp. 244-250.
Williams, *Organic Polymer and Non-Polymeric Materials with Large Optical Nonlinearities*, Angew. Chem., Int. Ed. Engl. vol. 23 (1984), pp. 690-703.
Yariv, *Coupled-Mode Theory for Guided-Wave Optics*, IEEE Journal of Quantum Electronics, vol. QE-9, Sep. 1973, pp. 919-933.

*Primary Examiner*—Akm E. Ullah
*Attorney, Agent, or Firm*—Raymond L. Owens

[57] ABSTRACT

A mulitchannel optical waveguide page scanner has a diode laser and a primary optical channel waveguide. Light is coupled from the diode into the primary channel waveguide. Multiple secondary side channels each have a thin-film electro-optic waveguide modulator. A series of T-branch connectors distribute light from the primary channel to the secondary side channels. Each of the electro-optic waveguide modulators is addressable individually.

31 Claims, 9 Drawing Sheets

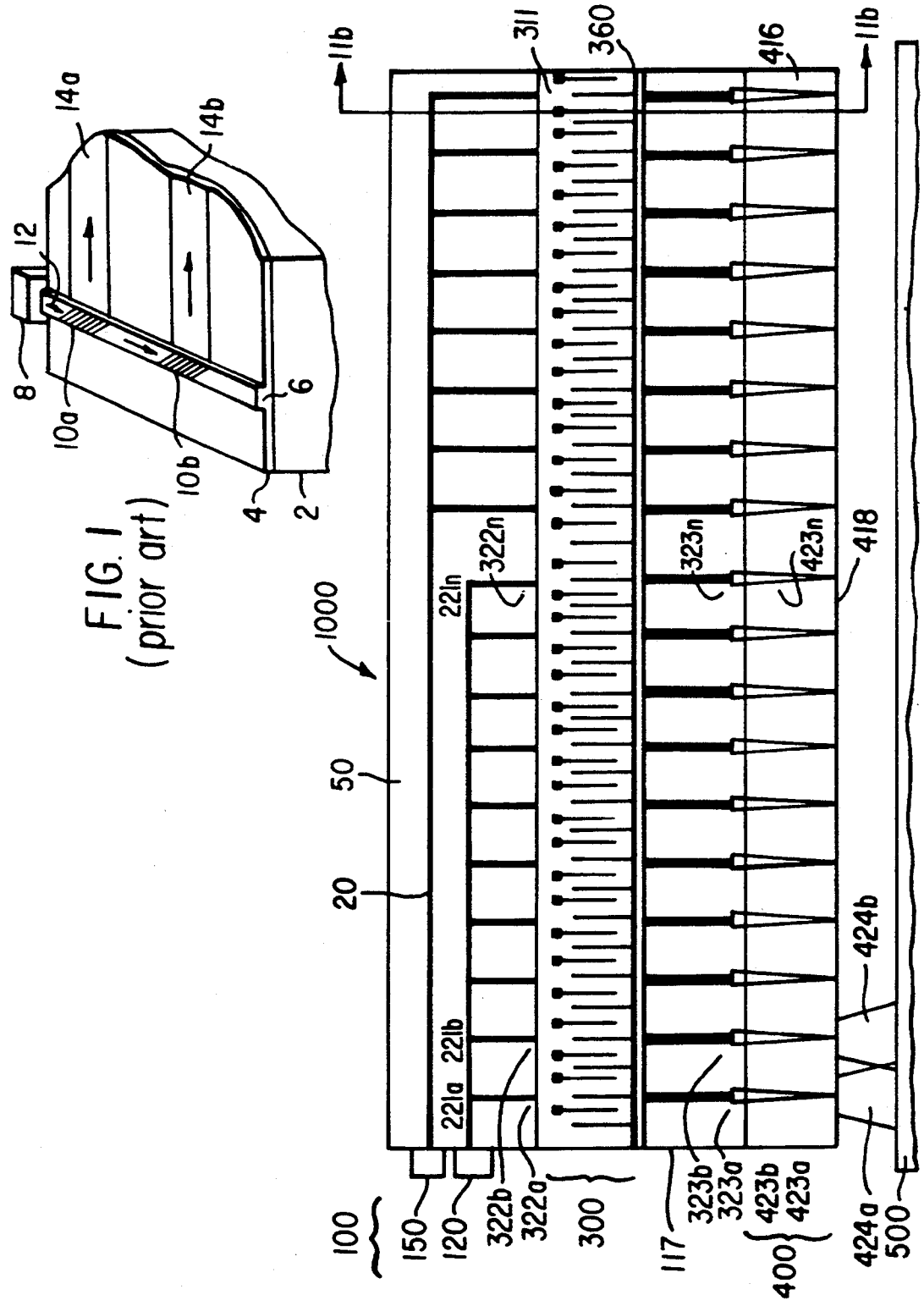

MULTICHANNEL OPTICAL WAVEGUIDE PAGE SCANNER WITH INDIVIDUALLY ADDRESSABLE ELECTRO-OPTIC MODULATORS

TECHNICAL FIELD OF THE INVENTION

The present invention generally pertains to electronic printing systems, and, more particularly to page scanners.

BACKGROUND OF THE INVENTION

Laser polygon scanners, hologon scanners, light valve arrays, and LED arrays are well known devices for selectively exposing or "writing on" photosensitive materials or "photoreceptors". These devices, usually referred to as page scanners, are incorporated in electronic printing systems and are used to record information on the moving photoreceptor by converting serial electronic data into a parallel array of picture elements, or "pixels", line-by-line, on the photoreceptor. Eventually, a full page of information is written as the photoreceptor completes its cycle of motion.

Recently, electro-optic page scanners have been proposed. U.S. Pat. Nos. 4,367,925 and 4,386,827 disclose a page scanner device in which a collimated sheet of light is total-internal-reflected off of the base of an inorganic electro-optic crystal. Selected pairs of parallel electrodes formed on or near the base of the crystal are energized by the application of an external voltage between these electrodes. The fringing electric fields extending into the electro-optic crystal in the region where the light is total-internal-reflected cause a phase change in that portion of the phase front of the collimated beam passing through the affected area. Schlieren optics are used to convert the phase-front modulated beam into a corresponding intensity-modulated pixel pattern representing an entire line of image information. Disadvantages of this device include difficulty in achieving uniformly high coupling efficiency between applied electric fields and optical fields for electro-optic modulation of the incident beam phase front, and expense of the relatively large electro-optic crystals of standard inorganic materials required for such scanners. U.S. Pat. No. 5,052,771 describes the use of thin-film waveguides composed of organic nonlinear optic materials to form an integrated optic waveguide scanner. The device described therein avoids many of the disadvantages associated with prior art electro-optic scanners.

One of the primary disadvantages of these electro-optic page scanner systems is that they require large, expensive lenses or lens arrays. Large lenses or lens arrays must be used because the physical dimensions of the lens or lens array which relays the image of the pixel pattern to the photoreceptor surface must be at least as large as the width of the page to be written. Typically, the page is on the order of 8 to 10 inches wide. This disadvantage can be partially offset by the use of Selfoc lens arrays; however, Selfoc lens arrays suffer from other problems such as severe chromatic aberration and non-uniformity of illumination. A second disadvantage, especially for those page scanner systems which employ incoherent illumination, is low light collection efficiency. In such systems light collection efficiency is limited by the numerical aperture of the lens system. In this respect the Selfoc lens array is no better than a conventional lens systems. Accordingly, it will be appreciated that it would be highly desirable to have a page scanner system with high coupling efficiency and relatively low expense which does not require large or bulky lenses.

The idea of using integrated optics to form compact lens-free devices for generating illumination arrays is not new. Kubota and Takeda in *Array Illuminator Using Grating Couplers*, Opt. Lett., Vol. 14, Jun. 15, 1989, pp. 651–652 reported a two dimensional illuminator formed by a thick multimode planar waveguide (thickness about 2.5 mm) with a two dimensional array of spaced grating couplers. The grating couplers were designed so that a guided collimated beam from a He-Ne laser source incident upon each grating in the array from inside the glass generated a beamlet that propagates in a direction normal to the waveguide surface. The disadvantage of such a device is that it is passive; no means are provided for individually modulating each beamlet. Furthermore, the total number of beamlets is limited by the relatively large losses associated with each grating.

U.S. Pat. No. 4,776,661 discloses an integrated optic device for performing optical data processing. The device is comprised of a planar waveguide on a substrate and a channel optical waveguide coupled to the planar optical waveguide. A grating coupler along a portion of the channel optical waveguide serves as a means of optically coupling the channel and planar optical waveguides. This device is shown schematically in FIG. 1. Laser diode source 8 endfire couples light into channel guide 6. Grating couplers 10a, 10b formed on channel waveguide 6 are designed to couple a portion of incident beam 12 into beamlets 14a, 14b which are guided in planar guide 4. As can be seen, this device serves to convert light from a single source into a linear array of collimated beamlets. No provision is made for modulating the individual beamlets or for coupling the light from the individual beamlets out of the channel waveguides in such a manner that the light remains collimated in the meridian normal to the plane of the waveguide.

Yet another prior art waveguide illuminator is disclosed in U.S. Pat. No. 4,765,703. This device is an electro-optic beam deflector for deflecting a light beam within a predetermined range of angle. It includes an array of channel waveguides and plural pairs of surface electrodes formed on the surface of a planar substrate of an electro-optic material such as single crystal $LiNbO_3$. The channel waveguide array is comprised of a main channel and a plurality of branch channels diverging from the main channel on either side of the main channel at respective branching portions. Light from a laser diode is endfire coupled into the main channel at one end of the device. The branch channels are angled with respect to the main channel so as to cover the predetermined range of angle. Each pair of deflector surface electrodes is disposed at a corresponding one of the branching portions of the channel waveguide array to produce an electric field locally at the corresponding branching portions of the channel waveguide, and thereby deflect the guided light beam from the main channel into the corresponding one of the plurality of the branch channels due to the electro-optical effect upon selective application of a voltage between the deflector electrodes. A cylinder lens condenses the light emanating from one of the plurality of branch channels in the meridian normal to the plane of the substrate at the output end of the device.

A principle disadvantage of the device of U.S. Pat. No. 4,765,703 is that the pixels must be addressed in series rather than in parallel. This limits the speed at which the device can operate. A further disadvantage is that light which is to be directed to pixels via corresponding branch channels farther away from the laser diode source must propagate through more electrode branching portions than light which is directed to pixels which are associated with branch channels that are closer to the laser diode source. This will result in nonuniformity of illumination if any light is absorbed or lost at each branching portion. Still another disadvantage of this device is that it is based on the electro-optic effect in bulk single crystal materials such as $LiNbO_3$. First of all, such bulk single crystals are usually expensive. Secondly, relatively large voltages are usually required to cause electro-optic deflection at each branching portion since the interaction with the electro-optic single crystal is via relatively weak electric fringing fields generated by electrodes on the crystal surface. This means that an array of expensive high voltage drivers would be required to provide the electrical signals for the device. Finally, the device has the disadvantages that all of the deflector electrodes and branching portions are located in series along the main channel. Since a finite length is required for each branching portion, the overall length of the device will be impractically large if the number of required pixels becomes large, for example, in the thousands.

Recently, strides have been made in the area of nonlinear optical organic materials. Penner et al. in U.S. patent application Ser. No. 735,550, filed Jul. 25, 1991 now abandoned, entitled *Improved Conversion Efficiency Second Harmonic Generator*, disclose means of forming poled noncentro-symmetric organic molecules by means of the Langmuir-Blodgett (LB) technique. Williams has proposed the use of electrically poled noncentro-symmetric organic molecules in guest-host polymer structures. See *Nonlinear Optical Properties of Guest-Host Polymer Structures*, Quantum Electronics: Principles and Applications, Vol. 1 (1987), edited by Chemla and Zyss. Another means of obtaining nonlinear optical properties is by electrically poling nonlinear molecular species which are co-polymerized with linear organic materials as described in U.S. Pat. No. 4,900,127. Disclosure of specific nonlinear organic molecules with large second order hyperpolarizabilities was made by Ulman et al., *New Sulfonyl-Containing Materials for Nonlinear Optics: Semiempirical Calculations, Synthesis and Properties*, J. Am. Chem. Soc., Vol. 112, No. 20, Sep. 26, 1990, and also by Williams, *Organic Polymer and Non-Polymeric Materials with Large Optical Nonlinearities*, Angew. Chem., Int. Ed. Engl. Vol. 23 (1984), pp. 690–703. Other references to organic nonlinear optical media in the form of transparent thin films are described in U.S. Pat. Nos. 4,694,066; 4,536,450; 4,605,869; 4,607,095; 4,615,962; and 4,624,872.

Use of an electro-optic polymer to form a channel waveguide with switchable optical taps is taught by T. E. Van Eck et al. in *Complimentary Optical Tap Fabricated in an Electro-Optic Polymer Waveguide*, Appl. Phys. Lett., Vol. 58, No. 15, April 1991, pp. 1588–1590. This article describes an "optical railtap" system formed by a main channel waveguide with complimentary directional coupler taps which are disposed at intervals along the main channel rail and which are connected to secondary side channels. The channel waveguides are formed of an electro-optic polymer with electrodes appropriately positioned so that, after poling, the complimentary directional coupler taps can be selectively addressed to couple a portion of the optical energy out of the main rail channel into preselected secondary side channels. Each complimentary directional coupler includes a pair of identical taps, one of which is connected to a dummy secondary side channel. The complimentary directional coupler is designed so that the same portion of optical power is drawn off of the main rail regardless of the voltage applied to the tap; optical power is either directed toward the pre-selected side channel or discarded in the dummy side channel.

Although the Van Eck et al. device is well-suited for use as a means of distribution of laser signals in a network in which there are relatively few, widely-spaced optical taps, it suffers several fundamental drawbacks with respect to applications such as a page scanner which has numerous closely spaced pixels. First of all, since each directional coupler tap is on the order of a millimeter in length, the placement of such taps in series along the rail limits the number and packing density of output channels per unit length of the main rail channel. Secondly, the fabrication tolerance of the two taps in each directional coupler is very tight. These taps must be made very nearly identical in order to avoid altering the optical power drawn off of the main rail channel as the state of the directional coupler is changed. Finally, the use of the organic polymer material to form those portions of the main rail and secondary side channels which do not require the electro-optic effect adds unnecessary optical loss to the system. Currently, channel waveguides formed of ion-exchanged glass can be made with far lower optical propagation losses than channel waveguides made of organic polymers. Thus for devices such as the page scanner, which require long propagation lengths, it is desirable to restrict the use of the higher propagation loss organic material to the modulator areas where the electro-optic effect is required.

SUMMARY OF THE INVENTION

The present invention is directed to overcoming one or more of the problems set forth above. The present invention provides a lensless page scanner device comprised of laser diodes, optical channel waveguides, and organic thin-film waveguide electro-optic modulators. It is divided into four different parts; namely, an input coupler, T-branch couplers, electro-optic modulators, and output couplers. Light from a single laser diode is coupled into a primary optical channel waveguide. Light in this primary channel is evenly distributed among multiple secondary side channels by a series of T-branch couplers. Thin-film electro-optic waveguide modulators are formed on the secondary channels. Provision is made to electrically address each modulator either by contacting custom LSI silicon driver chips or by thin-film transistors which are formed on the same substrate that supports the channel waveguides. Light is coupled out of the secondary side channels at a polished end face. The channel waveguide terminations are designed so that the exiting light forms a one dimensional array of collimated beamlets. The divergence of these beamlets is small enough that overlap of adjacent pixels is minimum at the photoreceptor plane.

The present invention deals with a channel waveguide page scanner which incorporates individually addressable electro-optic modulators. It is compact and either requires no external lens to relay the pixel illumination pattern to the photoreceptor plane or requires only a long narrow external cylinder or rod lens to condense the light emanating from the pixel array in the meridian perpendicular to the array.

The present invention exploits the nonlinear optical properties of certain organic thin films no form electro-optic waveguide light modulators. Thin films of any nonlinear optic medium could be used in place of the organic material. For example, thin films of inorganic materials such as potassium dihydrogen phosphate (KDP), potassium titanyl phosphate (KTP), ammonium dihydrogen phosphate (ADP), lithium niobate (LiNbO$_3$), lithium tantalate (LiTaO$_3$), or the like could be used as the medium.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic plan view of a prior art integrated optic device for performing optical data processing.

FIG. 2a is a diagrammatic plan view of a preferred embodiment of a scanner according to the present invention.

FIG. 3a illustrates variable-depth T-branch gratings for the scanner of FIG. 2a.

FIG. 4a is a somewhat detailed plan view of a preferred embodiment of the electro-optic waveguide modulator of FIG. 2a.

FIG. 4b is a sectional view along line IVb-IVb of FIG. 4a.

DETAILED DESCRIPTION OF THE PREFERRED EMBODIMENTS

Figure 2B:
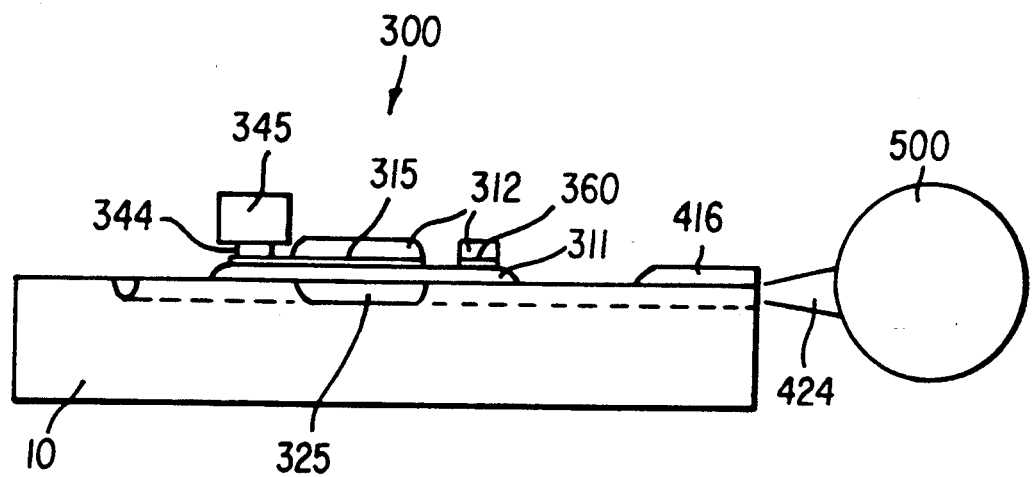
FIG. 2b is a sectional view of the scanner of FIG. 2a taken along line IIb—IIb.

FIGS. 2a and 2b are plan and sectional views, respectively, of a proposed page scanner device 1000 according to the present invention. The substrate 10 is a glass plate 2.5 cm to 25 cm long, 0.5 cm to 5 cm wide, and 1 mm to 5 mm thick. Single mode channel waveguides are formed on the plate using standard photolithographic techniques. The waveguide channels are 1 $\mu$m to 50 $\mu$m wide and 1 $\mu$m to 50 $\mu$m deep. The precise dimensions of single mode channel waveguides depend on the index of refraction difference between the channel region and the substrate region. A typical single mode channel would be 6 $\mu$m wide by 3 $\mu$m deep. The technique used to fabricate the channel waveguides must yield extremely low propagation loss waveguides. Typically, propagation losses should not exceed 0.1 to 0.5 dB/cm. The fabrication technique must also allow for the formation of complex structures such as T-branch couplers, overlay electro-optic modulators, and tapered output couplers. One technique that satisfies these requirements is the ion-exchange process. The ion-exchange process is well-known in the art (see, for example T. Findakly, *Glass Waveguides by Ion Exchange: A Review*, Optical Engineering, March/April 1985. Vol. 24. No. 2. pp 244–250). For this process a glass substrate such as Schott type BK7 or Schott type BGG36 or Corning pyrex is chosen which contains an ion-exchange species (i.e., sodium). The substrate is coated with a metal and the metal is photolithographically patterned to form a mask. Cation exchange occurs through the openings in the metal mask when the substrate is immersed in a bath of a molten salt (e.g., AgNO$_3$ or KNO$_3$, etc.). The regions where ion-exchange has occurred has an index of refraction which exceeds that of the non-exchanged regions. Other types of low-loss channel waveguides such as rib channel guides, in-diffused channel guides, and strip-loaded channel guides can be substituted for the ion-exchange type of channel waveguide.

Referring to FIG. 2a, end faces 117 and 418 are polished for input and output coupling, respectively, and transverse electric (TE) light from laser diode sources 120, 150 is endfire-coupled into primary channel waveguides 20, 50, respectively. Alternatively, light from laser diodes or other coherent sources (i.e., gas lasers) can be coupled into optical fibers which can in turn be endfire-coupled into the two primary channel waveguides. Note that the secondary channel waveguides associated with primary channel 20 are identical to those associated with primary channel 50, hence only the former are described.

Figure 2C:
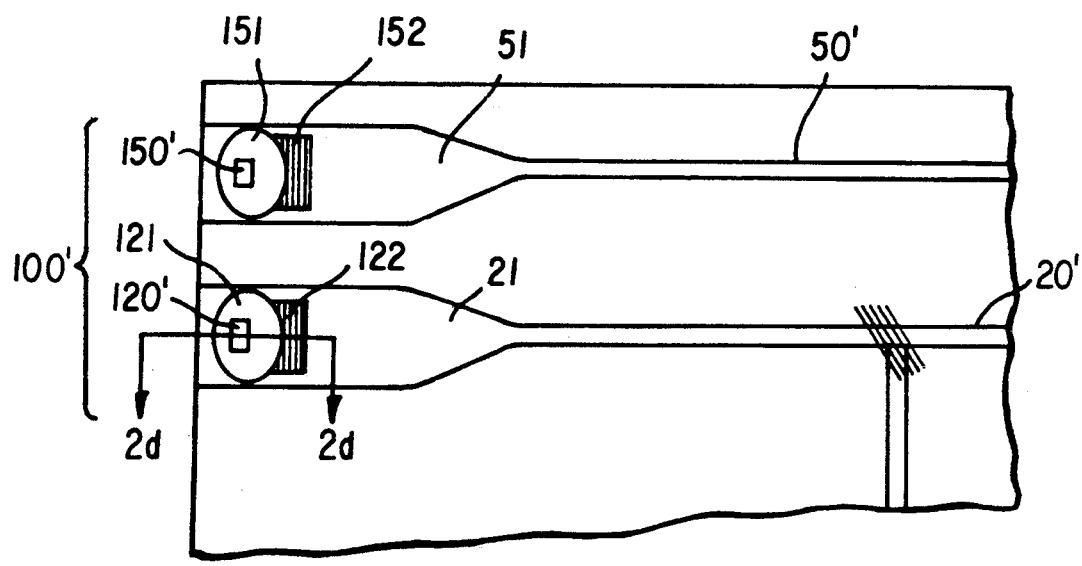
FIG. 2c is somewhat more detailed plan view of the input coupler of FIG. 2a, but illustrating another preferred embodiment.
Figure 2D:
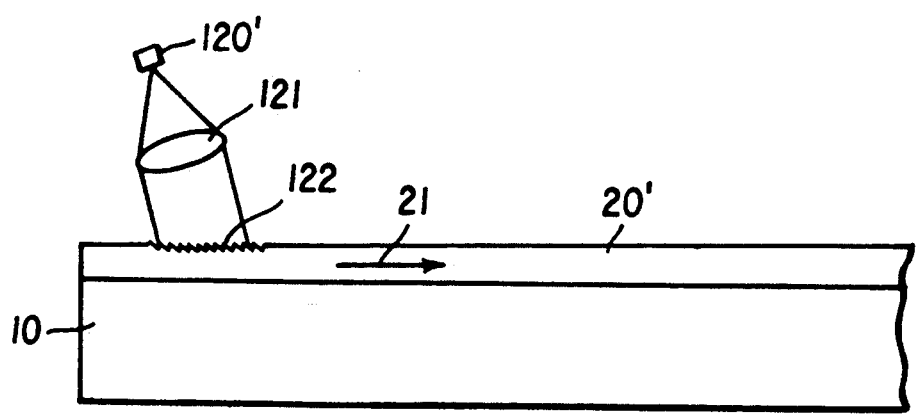
FIG. 2d is somewhat more detailed sectional view of the input coupler of FIG. 2c taken along line IId—IId, but illustrating another preferred embodiment.

FIGS. 2c and 2d show detailed plan and sectional views, respectively, of an alternative embodiment for the input coupler, 100. In this embodiment, lenses 121 and 151 collimate light from laser diodes 120' and 150', respectively. The lasers are oriented so that TE polarized light is coupled into widened channel waveguide sections 21 and 51, respectively, by means of blazed grating couplers 122 and 152, respectively. The blazing ensures that nearly 100% of the light incident from the laser diodes will be coupled into the respective channel waveguides. The widened channel waveguide sections 21 and 51 taper down adiabatically to join the single mode channel waveguides 20' and 50', respectively. Reference numeral 21 in FIG. 2d represents the light guided in channel waveguide 20'. This embodiment offers the advantage over the previously mentioned coupling means in that it is much more tolerant to errors in placement of the laser diodes.

Again referring to FIG. 2a, light is coupled into secondary side channel waveguides 322a, 322b, ..., 322n by means of T-branch couplers 221a, 221b, ..., 221n, respectively, which are spaced apart by a distance equal to the desired pixel spacing. For example, for a page scanner with 200 dots per cm resolution (about 500 dpi) the T-branch coupler separation would be 50 μm. They are fabricated in such a way that the amount of light in each secondary side channel is approximately the same from channel to channel across the array. This implies that the coupling strengths of the T-branch couplers must become progressively larger for those T-branch couplers farther away from the input coupler. Alternatively, the T-branch couplers could be formed identically so that a diminishing portion of light would be coupled into each successive secondary side channel. The amount of light in each side channel could then be equalized by forming variable absorbers on each secondary side channel. The T-branch couplers also serve the function of converting the TE polarized light in the primary channel waveguide to transverse magnetic (TM) polarized light in the secondary side channels. The T-branch couplers are described later on in more detail with reference to FIGS. 3a–c.

Electro-optic waveguide modulators 300a, 300b, ..., 300n are formed on each of the secondary channel waveguides 322a, 322b, ..., 322n. These modulators are well-known in the art as Mach Zehnder interferometric, or MZ, modulators. The operational characteristics of these MZ modulators will be described later on. Electrical addressing of the individual modulators is achieved by well-known circuitry incorporated in a LSI silicon driver chip 345 (see FIG. 2b) having electrical contact pads 343a, 343b, ..., 343n (not shown) and 344a, 344b, ..., 344n (see FIG. 2b). Silicon driver pads 343a, 343b, ..., 343n and 344a, 344b, ..., 344n provide signals −Va, −Vb, ..., −Vn and +Va, +Vb, ..., +Vn, respectively. Electrical contact between modulator electrodes 315a, 315b, ..., 315n, and silicon driver contact pads 344a, 344b, ..., 344n is made via contact pads 347a, 347b, ..., 347n (see FIG. 4a). Likewise, contact between modulator electrodes 314a, 314b, ..., 314n and silicon driver contact pads 343a, 343b, ..., 343n (not shown) is made via contact pads 346a, 346b, ..., 346n (see FIG. 4a). Alternatively, silicon driver chip 345 could be eliminated entirely if polysilicon thin film transistors (TFT) were deposited on the glass substrate 10 and connected electrically to the modulator electrodes. In this case, only the data, clock, and power supply lines would have to be provided to address the electro-optic modulator array.

Channel waveguides 323a, 323b, ..., 323n, which are on the output side of the MZ modulators, terminate in tapered output couplers 423a, 423b, ..., 423n. A glass cover sheet 416 extends the full length of the page scanner and is about 2 to 5 mm wide and 0.1 to 2 mm thick. This cover sheet has an index of refraction that matches that of the substrate and is bonded to the substrate with index matching epoxy. The endface 418 is polished with the cover sheet in place. The tapered output couplers 423a, 423b, ..., 423n, combined with the index-matching cover sheet 416, serve to cause the guided modes in the single mode secondary channel waveguides to expand adiabatically before exiting the output face of the page scanner. If the guided mode size is expanded sufficiently, the divergence due to diffraction of the output beamlets 424a, 424b, ..., 424n will be such that beamlet overlap at the photoreceptor 500 is within acceptable limits. Details associated with the electro-optic waveguide modulators and tapered output couplers are discussed later with reference to FIG. 4.

Figure 3A:
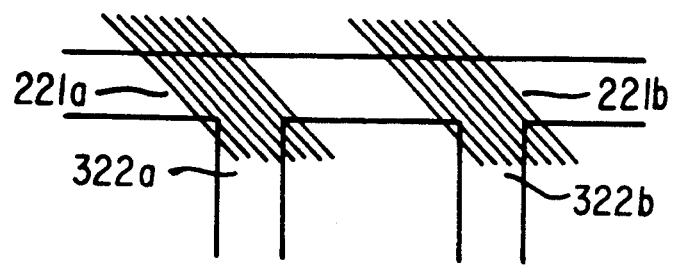
Figure 3B:
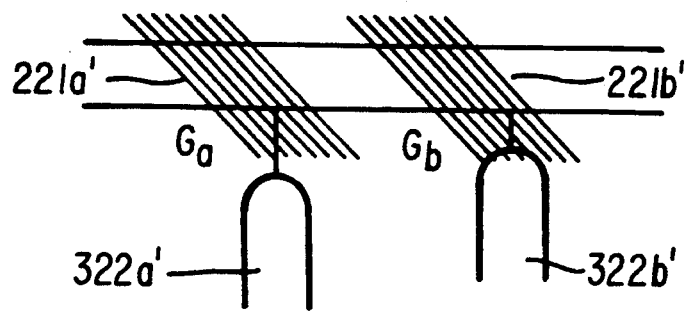
FIG. 3b is similar to FIG. 3a, but illustrates another embodiment for forcing the amount of optical power output from each secondary side channel to be the same.
Figure 3C:
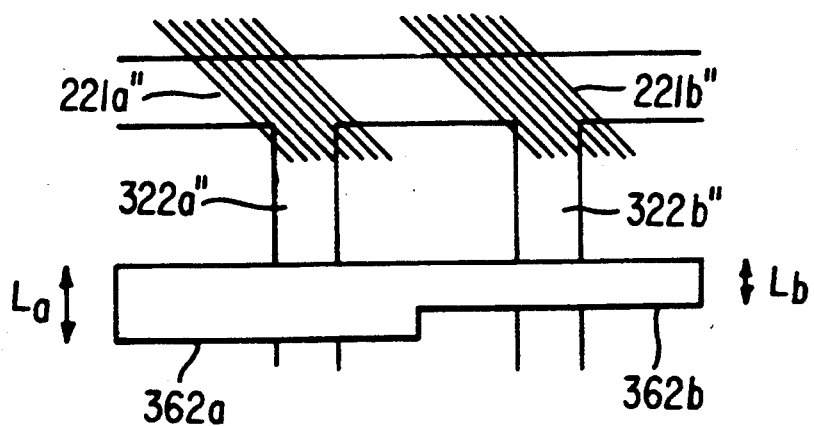
FIG. 3c is similar to FIGS. 3a–b, but illustrates another embodiment for obtaining constant optical power output from each of the secondary side channel waveguides.

The fabrication of T-branch couplers is crucial to the operation of this page scanner device. These couplers must exhibit low scattering losses, they must be capable of deflecting small amounts of optical power from primary channel into the secondary channels, and they must convert TE polarized light in the primary channel to TM polarized light in the secondary side channels. In addition, means should be available for adjusting the amount of light in successive secondary side channels so that nearly uniform output is obtained from secondary channel to secondary channel, FIGS. 3a, 3b, and 3c show several alternative schemes for forming the T-branch couplers. In all cases, light is incident from the left hand primary channel and partially deflected into the lower secondary channels.

FIG. 3a depicts variable-depth T-branch gratings 221. TE polarized light is incident on the gratings at a 45 degree angle of incidence and a portion of this light is diffracted into secondary side channels 322. The T-branch grating pitch is given by $$\lambda_G = \frac{\lambda}{\sqrt{2} \, N_{TE}} \quad (1)$$

where λ is the wavelength of light in vacuum and $N_{TE}$ is the effective index of refraction of the light guided in the primary channel waveguide.

The depths of successive T-branch couplers are varied in such a way that the same optical power is coupled into each secondary side channel waveguide. It is known from the literature (L. A. Weller-Brophy and Do G. Hall, *Local Normal Mode Analysis of Guided Mode Interactions with Waveguide Gratings*, Journal of Lightwave Technology, Vol., 6, June, 1988, pp 1069–1082) that only TM polarized light can be diffracted by a grating when incident waveguide light is TE polarized and at a 45 degrees angle of incidence to the grating. Successive T-branch gratings are formed with increasing groove depths according to the formula:

$$\Delta h_n = \frac{\sqrt{8} \, \tanh^{-1}[\sqrt{R_n}]}{\chi w_g} \quad (2)$$

where $\Delta h_n$ is the groove depth of the nth T-branch grating and $w_g$ is the width of the channel waveguides. $R_n$ is the diffraction efficiency of the nth T-branch grating and is given by the formula:

$$R_n = \frac{\beta(1-q)}{N p_{sc}^{n-1}(1-q) - \beta p_{mc}(1-q^{n-1})} \quad (3)$$

where $$p_{sc}r_{sc} \exp(-\alpha_{sc}L_{sc})$$

$$p_{mc} = \exp\left[\frac{-\alpha_{mc}L_{mc}}{N-1}\right]$$

$$q = r_{mc}p_{mc}$$

and other parameters are defined as follows:

$\beta$ = fraction of input light that is usable $1 - r_{mc}$ = attenuation of light in primary channel due to scattering at T-branch grating, $\alpha_{mc}$ = loss coefficient for light propagating in primary channel waveguide, $L_{mc}$ = length of primary channel waveguide, $1 - r_{ac}$ = attenuation of light in secondary channel due to modulator, $\alpha_{sc}$ = loss coefficient for light propagating in secondary channel waveguide, $L_{sc}$ = length of secondary channel waveguide, and N = total number of T-branch grating couplers along primary channel waveguides.

The fraction, $\beta$, is the ratio of the total optical power coupled out of all of the secondary side channels to the input optical power. It should be noted that the maximum value of $\beta$ is unity in the absence of losses due to scattering in the primary and secondary channel waveguides and at the T-branch grating couplers. However, in the presence of losses, $\beta$ is less than or equal to the quantity $\beta_{max}$ given by the expression:

$$\beta_{max} = \frac{Np_{sc}q^N(1-q)}{p_{mc}(1-q^N)} \quad (4)$$

The product $\chi\Delta h_n$ is the TE-TM coupling coefficient of the nth grating and is given in the Weller-Brophy reference cited previously according to the formula:

$$\chi = \sqrt{2C_{TE}C_{TM}} \frac{[N_{TM}^2 - n_c^2]^{\frac{1}{2}}}{q_c^{\frac{1}{2}}n_c} \quad (5)$$

where $$C_{TE} = \frac{\pi}{\lambda} \frac{n_f^2 - N_{TE}^2}{h_{eff,TE}N_{TE}},$$

$$C_{TM} = \frac{\pi}{\lambda} \frac{n_f^2 - N_{TM}^2}{h_{eff,TM}N_{TM}},$$

$$h_{eff,TE} = h_o + \frac{\lambda}{2\pi\sqrt{N_{TE}^2 - n_c^2}} + \frac{\lambda}{2\pi\sqrt{N_{TE}^2 - n_s^2}},$$

$$h_{eff,TM} = h_o + \frac{\lambda}{2\pi q_c\sqrt{N_{TM}^2 - n_c^2}} + \frac{\lambda}{2\pi q_s\sqrt{N_{TM}^2 - n_s^2}},$$

$$q_c = \frac{N_{TM}^2}{n_f^2} + \frac{N_{TM}^2}{n_c^2} - 1, \text{ and}$$

$$q_s = \frac{N_{TM}^2}{n_f^2} + \frac{N_{TM}^2}{n_s^2} - 1.$$

where

It should be noted that in deriving Equation (5) the diffused channel waveguides are approximated by a single mode planar slab waveguide. In this equation, $h_o$ is the equivalent depth of the channel waveguide; $n_c$, $n_f$, and $n_s$ are the indexes of refraction of the cover, channel waveguide, and substrate, respectively; and $N_{TE}$, $N_{TM}$ are the effective refractive indexes of the slab waveguide for the TE0 and TM0 modes, respectively.

As an example consider the following page scanner:

$$n_c = 1.00 \quad (6a)$$

$$n_f = 1.64$$

$$n_s = 1.60$$

$$h_o = 1.0 \ \mu m$$

$$\lambda = 0.83 \ \mu m$$

$$N = 1000$$

$$\alpha_{sc} = \alpha_{mc} = 0.023 \ cm^{-1}$$

$$L_{mc} = L_{sc} = 5 \ cm$$

$$r_{sc} = r_{mc} = 1$$

$$\beta = 0.5$$

$$w_g = 5 \ \mu m$$

Using the above data in Equations (1) through (5), the following results are obtained for the slab waveguide approximation:

$$N_{TE} = 1.6170833 \quad (6b)$$

$$N_{TM} = 1.6148872$$

$$\Lambda_G = 0.363 \ \mu m$$

$$\beta_{max} = 0.84$$

$$R_1 = 0.00056$$

$$R_{500} = 0.00083$$

$$R_{1000} = 0.00155$$

$$\Delta h_1 = 0.106$$

$$\Delta h_{500} = 0.129$$

$$\Delta h_{1000} = 0.177$$

The value of $\beta_{max} = 0.84$ is consistent with the assumed value of $\beta = 0.5$.

One means of fabricating variable depth T-branch gratings is described as follows. First of all, the glass substrate is coated with a 300 Å thick film of Al$_2$O$_3$ followed by a 1500 Å thick film of aluminum. Photoresist is applied and exposed through a photomask which is opaque everywhere except in those areas corresponding to the branched channel waveguide pattern. The photomask also has open areas outside the channel waveguide pattern. These additional openings provide for fiducial marks to be applied to the substrate for subsequent alignment of the gratings to the T-branches. After exposure, the photoresist pattern is transferred to the aluminum/Al$_2$O$_3$ layers by etching. The aluminum is removed from the channel waveguide and fiducial mark areas with the standard aluminum etch and the $Al_2O_3$ is etched with 20 mg of $CrO_3$ in 35 ml of phosphoric acid which is dissolved in one liter of water. The resist is stripped following the etch processing. The patterned substrate is then placed in a melt containing 2% $AgNO_3$, 33% $KNO_3$, and 65% $NaNO_3$ at a temperature of 340° C. for 10 minutes. During this time, the silver ions in the melt diffuse into the substrate through the openings in the metal mask and exchange with the sodium ions in the glass to form the channel waveguides. After the ion exchange process, the substrate is coated a second time with photoresist which is exposed with a pattern that is designed to protect the fiducial marks. The remaining aluminum and $Al_2O_3$ are etched off followed by removal of the photoresist.

Photoresist is coated on the substrate for a third time and exposed through a mask which is opaque only in those areas corresponding to the locations of the T-branch gratings. This mask has on it alignment marks which, when aligned with the fiducial marks on the substrate, permit precise positioning of the gratings over the T-branches. The T-branch gratings should be centered directly over the center of the T-branches and the grating region should extend over the entire T-branch area as shown in FIG. 3a. The photoresist is then subjected to an image reversal process which has the effect of making the exposed regions insoluble in resist developer while leaving unexposed areas unaffected. The image reversal process is carried out in a model LP-III vapor prime/image reversal oven available from Yield Engineering Systems, Inc. (1080 E. Duane Ave., Sunnyvale, Calif. 94086). After image reversal processing, the resist is exposed a second time to form the grating patterns. The grating patterns are obtained holographically. The photoresist that forms the gratings in the T-branch areas develops and undissolved resist is left everywhere else. This resist pattern is transferred to the glass substrate by argon ion milling.

The substrate is placed in the ion mill beneath a slit shutter which is attached to a mechanical drive. The slit shutter is initially opened wide so that all of the T-branch gratings are milled. The slit is gradually closed so that T-branches at the beginning of the primary channel waveguide are hidden from the ion beam. This is continued until only the T-branches at the extreme end of the primary channel waveguide are exposed to the milling beam. In this manner, the T-branch gratings which are exposed for the longest period of time, that is the gratings toward the extreme end of the primary channel waveguide, are milled the deepest while those gratings toward the beginning of the primary channel waveguide are the shallowest. The rate of closing of the slit shutter is controlled by computer so that the grating depths vary as prescribed by Equation (2). In the numerical example given above, the T-branch grating at the extreme end of the primary channel would be milled $\Delta h_{1000} = 0.177$ $\mu m$ deep, whereas, the T-branch grating at the beginning of the primary channel waveguide would only be milled $\Delta h_1 = 0.106$ $\mu m$ deep. Alternatively, real time adjustment of the T-branch coupling efficiency could be realized by monitoring in-situ the power exiting from each secondary channel waveguide. A feedback signal proportional to this output power could then be used to control the slit opening of the shutter.

FIG. 3b shows an alternative means of equalizing the optical power output from the secondary side channels. The depth of all T-branch gratings 221' are the same in this case, and the amount of light coupled into each secondary side channel 322' is controlled by introducing a gap 352 of width $G_n$ between the primary channel waveguide and each secondary side channel. The width of the gap determines how much light reaches the secondary side channel. Analytically, this embodiment is identical to the previous variable grating depth embodiment described in FIG. 3a. In this case, the efficiency of coupling light from the primary channel waveguide to secondary side channel waveguides 322' is given by $$R_n = R_o \exp(-\alpha_G G_n) \qquad (7)$$

where $$\alpha_G = \frac{4\pi}{\lambda} \sqrt{N_{TM}^2 - n_s^2}$$

and all other quantities are the same as defined previously in and following Equation (3). $R_o$ is the diffraction efficiency of T-branch grating 221' which is the same for all T-branches. Equating the right hand sides of Equations (3) and (7) and solving for $G_n$ yields the expression $$G_n = \frac{\ln \frac{R_o}{\beta} + \ln\left[\frac{Np_{sc}q^{n-1}(1-q) - \beta p_{mc}(1-q^{n-1})}{1-q}\right]}{\alpha_G} \qquad (8)$$

where again all quantities are as defined previously. $\beta_{max}$ is the same as given in Equation (4). If the last T-branch coupler has no gap, a value for $R_o$ can be obtained from Equation (8) with $G_N$ set equal to zero and n set equal to N $$R_o = \frac{\beta(1-q)}{Np_{sc}q^{N-1}(1-q) - \beta p_{mc}(1-q^{n-1})} \qquad (9)$$

Selecting numerical values for the various parameters to be the same as those values as specified in Equation (6a), $$\beta_{max} = 0.84 \qquad (10)$$

$$R_o = 0.00155$$

$$G_1 = 0.306 \ \mu m$$

$$G_{500} = 0.188 \ \mu m$$

$$G_{1000} = 0.00$$

are obtained from Equations (4), (9), and (8).

FIG. 3c represents yet another alternative means for obtaining constant optical power output from each of the secondary side channel waveguides. In this embodiment, all T-branch gratings 221" have the same diffraction efficiency and the light levels in the individual secondary side channels 322" are controlled by variable length thin metal absorption layers 362 deposited on top of the secondary side channel waveguides. In this case the lengths of the metal films are given by $$L_n = \frac{\ln\frac{P_{sc}}{\beta} - (n-1)\ln\left[\frac{N}{r_{mc}P_{mc}(N-1)}\right]}{\alpha_L} \quad (11)$$

where $L_n$ is the length of the metal absorber for the nth secondary side channel waveguide and $\alpha_L$ is the propagation power loss coefficient for the metal loaded secondary side channel waveguide. The maximum possible value of $\beta$ is given by $$\beta_{max} = r_{sc}\exp(-\alpha_{sc}L_{sc} - \alpha_{mc}L_{mc})\left[\frac{r_{mc}(N-1)}{N}\right]^{N-1} \quad (12)$$

and the optimum value of the diffraction efficiency of the T-branch gratings is given by the relationship $$R_o = 1/N \quad (13)$$

If the same parameters as given in Equations (6a) are used and if the metal film is taken to be 500 Å of gold (with complex index of refraction at $\lambda=0.83$ μm of $n_m=0.188+5.39j$), a value of $\alpha_L=0.00439$ μm$^{-1}$ is obtained. Using Equations (11), (12), and (13) yields the values $$\beta_{max}=0.29 \quad (14)$$

$$R_o=0.001$$

$$L_1=255 \ \mu m$$

$$L_{500}=126 \ \mu m$$

$$L_{1000}=0.00 \ \mu m$$

The embodiments depicted in FIGS. 3a and 3b have the advantage that $\beta_{max}$ is 0.84. This relatively large value means that a large fraction of the total input power is usable. The disadvantage of the variable depth grating T-branch coupler array is that it involves complicated ion mill processing. The variable gap T-branch coupler array will also be somewhat difficult to fabricate due to the tight tolerances of the gaps. On the other hand, the alternative embodiment shown in FIG. 3c can be fabricated more easily by using standard photolithographic processing. The disadvantage of this particular embodiment is that $\beta_{max}$ is only 0.29 since most of the light is absorbed by the thin film metal absorbers.

It should be mentioned that the T-branch gratings in all three embodiments could be formed by the resist gratings themselves without need for further ion milling and resist stripping. In the case of the embodiment involving the variable depth T-branch gratings (FIG. 3a), oxygen plasma etching of the resist through a variable slit shutter could be used to obtain the desired grating depth as a function of T-branch position. Alternatively, T-branch gratings could be embossed either directly into the glass substrate, or into a thin transparent plastic film deposited on top of the substrate which would be designed especially to be embossed.

Figure 4A:
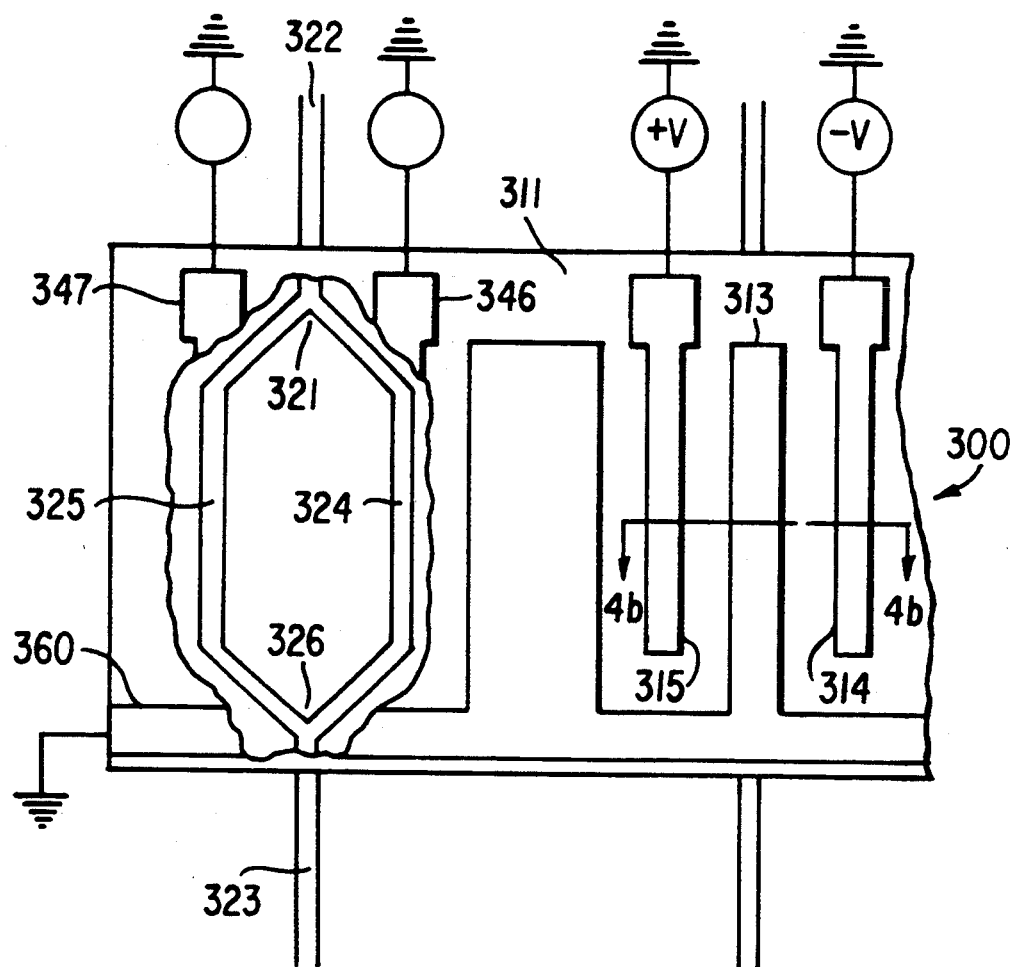

A detailed plan view of a preferred embodiment of an electro-optic waveguide modulator 300 is shown in FIG. 4a. Note that in this figure and subsequent figures, subscripts identifying individual secondary side channels are omitted for simplicity. Single mode secondary side channel 322 is split into two separate single mode channel waveguides 324 and 325 at Y-branch 321. Channel waveguides 324 and 325 recombine to form single mode channel waveguide 323 at Y-branch 326 shown in the cutaway view in FIG. 4a. NLO layer 311 covers the entire MZ interferometer section defined by Y-branches 321 and 326 and waveguide channels 324 and 325. Metal electrode fingers 314 and 315 are formed on NLO layer 311 directly above channel waveguides 324 and 325, respectively. The widths of the electrode fingers are equal to or greater than the widths of the channel waveguides. Widths of the fingers are from 1 to 10 μm and preferably 5 μm. The widths of the channel waveguides are from 1 to 5 μm and preferably 3 μm. Electrodes 314 and 315 are connected to contact pads 346 and 347, respectively, which serve as means of connection to drive voltages $-V$ and $+V$. Counter finger electrode 313 is connected to ground via bus bar 360.

Figure 4B:
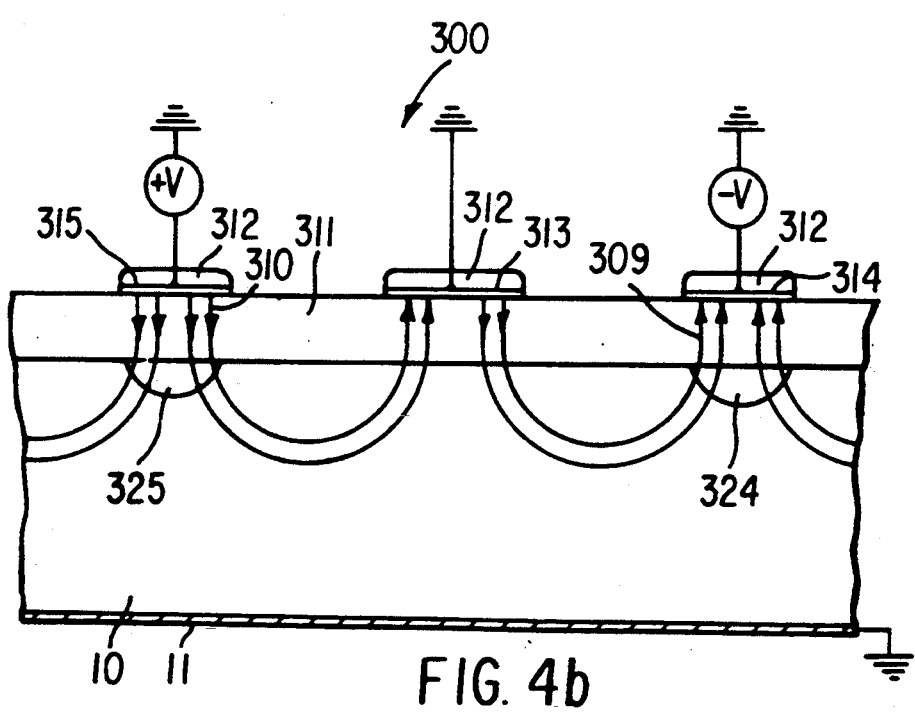

FIG. 4b is a detailed cross sectional view along line IVb-IVb of FIG. 4a. In this figure, NLO layer 311 is shown in proximity to channel waveguides 324 and 325. The NLO layer is electrically poled by shorting together electrodes 314 and 315, heating and substrate to a temperature just below the glass transition of the NLO material. A voltage is then applied between shorted electrodes 324, 325 and ground electrode 313. The temperature of the substrate is then lowered back to ambient. Finally the poling voltage is disconnected and the short between electrodes 314 and 315 is removed. Alternatively, finger electrode 313 could be left floating and a separate poling ground plane 11 could be formed on the bottom surface of substrate 10 by depositing a thin metal film on this surface. In this case, the poling voltage would be applied between shorted electrodes 314 and 315 and ground plane 11. This additional ground plane would be used only for poling and could be etched off, if necessary, after the poling process has been completed. Reference numeral 312 represents photoresist which has been left on top of the metal electrodes and serves as a dielectric to prevent electrical breakdown when voltages are applied between the electrodes. It will be appreciated that an additional dielectric layer (not shown) could be deposited on top of the entire electrode area including the resist layer if environmental protection or further dielectric strength is required. It should be noted that layer 312 or the additional dielectric layer should not extend over the contact pads 346, 347 (see FIG. 2b).

Again referring to FIG. 4b, drive voltages $-V$, $+V$ are applied between electrodes 314 and 315, respectively, and ground electrode 313. Electric fringing fields indicated by reference numerals 309 and 310, are established in NLO layer 311 and these fields induce changes in the index of refraction by virtue of the linear electro-optic effect in the NLO material. This change in index of refraction modifies the effective indexes of refraction of the guided optical modes of channel waveguides 324 and 325 which are proximate to the NLO layer. The changes in effective refractive index of the guided optical modes is given approximately by $$\Delta N_{TM} \pm \gamma \frac{n_{NLO}^3}{2} r_{33}E \quad (15)$$

where

-continued $$E = \rho \frac{V}{d}$$

and $$\gamma = \frac{\int_0^d H(x)H^*(x)dx}{\int_{-\infty}^{+\infty} H(x)H^*(x)dx}$$

The sign of the electro-optically induced effective index change, $\Delta N_{TM}$, in Equation (15) depends on the polarity of the applied electric field with respect to the local poling direction in the NLO layer. Consequently, the sign of $\Delta N_{TM}$ is positive for that region of the NLO layer adjacent to electrode 314 and negative for that region of the NLO layer adjacent to electrode 315. $\gamma$ is the overlap integral of the TM guided mode optical field distribution, H(x), with the applied electric field in the NLO layer proximate to the channel waveguides. X is the coordinate measured in the direction perpendicular to the substrate surface from the NLO/substrate interface and d is the thickness of the NLO layer. $n_{NLO}$ and $r_{33}$ are the index of refraction and linear electro-optic coefficient of the NLO material, respectively, and E is the magnitude of the electric fringing field in the NLO layer adjacent to the channel waveguides. The expression for E given above includes the magnitude of the applied voltage, V, and the thickness of the NLO layer, d. Also included in this expression is the factor $\rho$ which accounts for the fact that the electric field is a fringing field between electrodes 314 or 315 and 313. The condition $\rho=1$ would correspond to uniform applied electric fields, which occurs if the ground electrode 313 is located at the x=0 plane in FIG. 4b.

The intensity of guided light exiting MZ modulator 300 is given by the well-known formula $$I = I_0 \cos^2 \left[ \frac{2\pi \Delta N_{TM} L_{MZ}}{\lambda} \right] \quad (16)$$

where $I_o$ is the intensity of the incident light in channel waveguide 322 and $L_{MZ}$ is the length of the MZ modulator. Combining Equations (15) and (16) an expression for the voltage required to cause the light exiting the MZ modulator to vary from a maximum to zero can be obtained $$V_\pi = \frac{\lambda d}{2\gamma \rho_{33} n_{NLO}^3 L_{MZ}}. \quad (17)$$

A value of $V_\pi$ can be estimated from Equation (17) by approximating the ion exchanged channel waveguide by a planar slab waveguide with $n_s=1.60$, $n_f=1.64$, $n_{NLO}=1.60$ and $r_{33}=30$ pm/V. If the thickness of the waveguide film is taken to be one micron, $\gamma$ can be calculated and is found to be approximately 0.10. The value of d, the NLO layer thickness, is determined by the requirement that d be as small as possible subject to the constraint that propagation losses due to interaction of the guided radiation in the waveguide with finger electrode 314 or 315 is well below 1 dB/cm. If d is taken as 2 $\mu$m, the loss due to a 400 Å gold finger electrode can be calculated and is found to be approximately 0.33 dB/cm. Furthermore, if finger electrodes 314 and 315 are both separated from ground electrode 313 by 12.5 $\mu$m, a value of $\rho=0.22$ is obtained. Finally, if the length of the MZ modulator is taken to be 1 cm, a value of $V_\pi \sim 31$ volts is obtained.

It will be obvious to those skilled in the art that the two alternative embodiments diagramed in FIGS. 4a through 4d could also be poled with opposite polarity voltage applied to the electrode fingers 314 and 315. This alternative poling scheme eliminates the need for applying bipolar drive voltages $\pm V$ to the two arms of the MZ interferometer. Instead, only a single polarity voltage would be required to drive finger electrodes 314, 315 and the change in sign of $\Delta N_{TM}$ for channel waveguide 324, 325 would be generated as a result of a change in sign of the electro-optic coefficient, $r_{33}$, rather than a change in sign of the electric field, E, in the NLO film proximate to these two channel waveguides (see Equation (15)).

A possible processing sequence to realize the MZ modulator array is as follows. After formation of the primary, secondary side channel waveguides, and the T-branch gratings, the input edges and the output edges of the substrate are polished. Next, an NLO layer from 1 to 5 $\mu$m and preferably 2 $\mu$m in thickness is spin-coated on the substrate. A layer of gold or aluminum, from 500 to 3000 Å thick and preferably 1500 Å thick, is then evaporated on top of the NLO layer through a shadow mask which prevents the metal from covering the fiducial marks previously formed on the substrate. Photoresist is spin-coated on top of the entire device and is patterned with a mask which is opaque only in those areas which will eventually become contact pads 346 and 347, electrode fingers 314 and 315, ground electrode 313, and bus 360. The mask is positioned so that electrode fingers 314 and 315 are located directly over channel waveguides 324 and 325, respectively. The fiducial marks that were formed on the substrate and used to align the T-branch gratings can also be used to align the electrode mask. After development of the resist pattern, gold or aluminum is etched away in the areas where the resist was removed. A suitable gold etch would be 20 gm of potassium iodide and 5 gm of iodine in 200 ml of deionized water. Aluminum etches are commercially available. An example of such an etch would be Doe and Ingalls type M484-013 aluminum etch (Doe and Ingalls, Mfg., 607 Ellis Road, Durham, N.C.). A shadow mask which extends over that portion of the device where the MZ modulators have been formed but which does not extend to the contact pads 346, 347 is placed into position. The organic NLO film covering the T-branch grating array and the resist covering contact pads 346, 347 are removed by oxygen plasma etching.

Figure 4C:
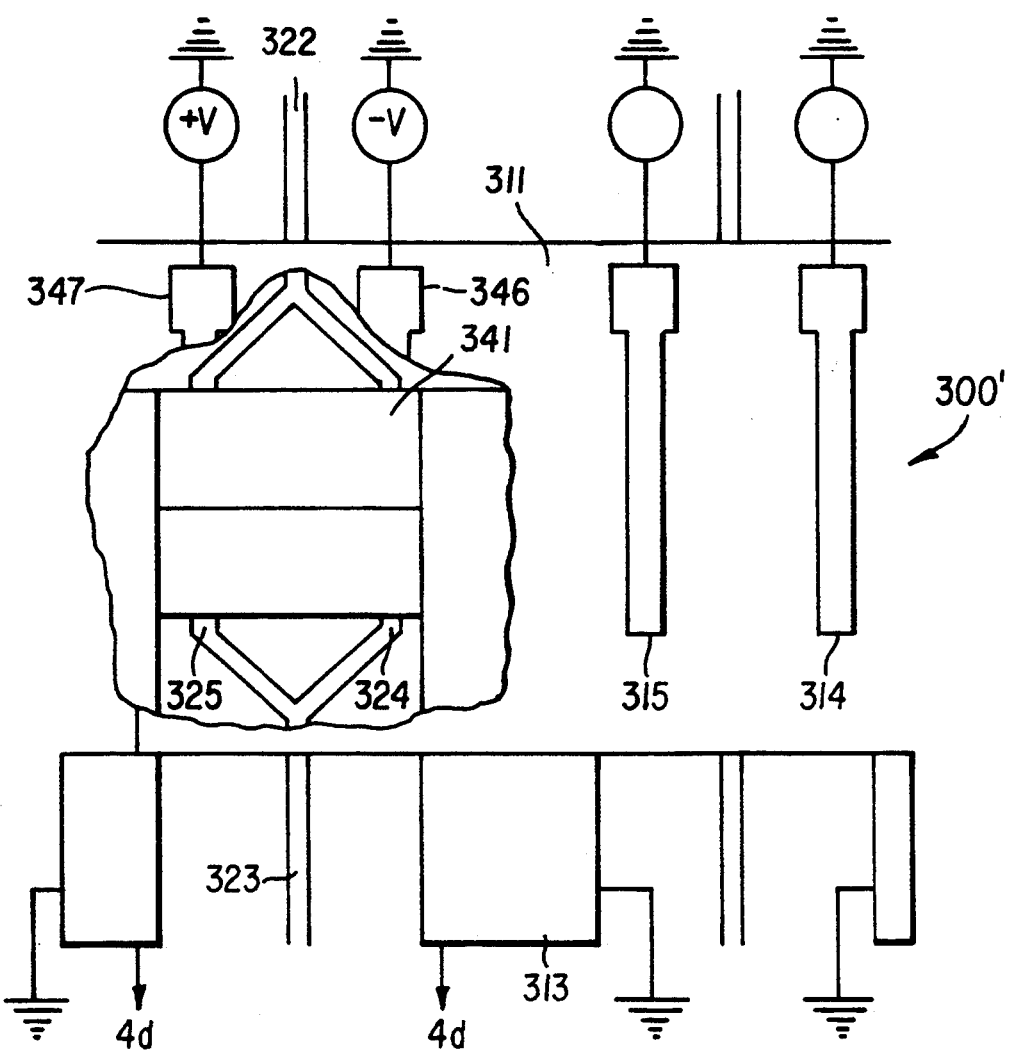
FIG. 4c is a detailed plan view of the modulator of FIG. 2a, but illustrating another embodiment.
Figure 4D:
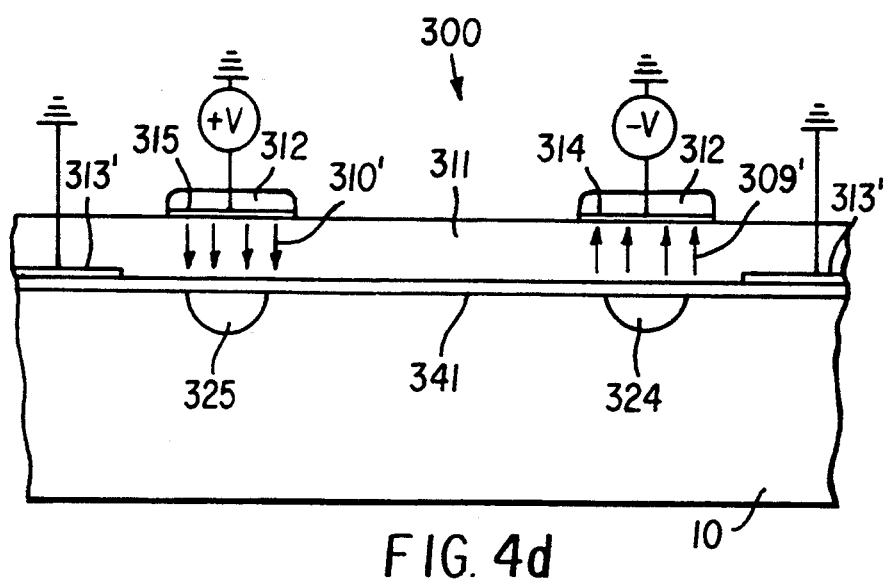
FIG. 4d is a sectional view of the M-Z modulator taken along line IVd-IVd of FIG. 4c.

FIGS. 4c and 4d show detailed plan and cross sectional views of an alternative embodiment of the MZ modulator 300'. The cross sectional view shown in FIG. 4d is taken along line IVd—IVd of FIG. 4c. In this alternative embodiment transparent electrical ground plane 341 is deposited on the surface of substrate 10. This film extends over channel waveguides 324, 325. NLO film 311 is sandwiched between transparent conductive film 341 and electrode fingers 314, 315. Electrode fingers 314, 315 are positioned directly above channel waveguides 324 and 325, respectively. Several requirements are placed on the physical properties of film 341 since it is in direct contact with channel waveguides 324 and 325. This film should be between 50 to 1000 Å and preferably 100 Å thick and have low optical scattering losses. It should have a refractive index imaginary part on the order of $10^{-5}$ or less and a sheet resistivity less than $10^8 \Omega/m^2$. Candidate materials for such a film include indium tin oxide (ITO) and other metal oxides such as $Ta_2O_5$ with high concentrations of oxygen vacancies. FIG. 4c shows a cutaway plan view of the MZ modulator according to this embodiment.

Referring to FIG. 4d, metal electrode 313' contracts transparent conductive film 341 in regions which are removed from the channel waveguides 324, 325. NLO layer 311 is atop both metal contact electrode 313' and transparent conductive layer 341. Finally, upper electrode fingers 314 and 315 are shown on top of NLO layer 311 and directly above waveguide channels 324 and 325, respectively. Drive voltages and electric poling voltages are applied to electrode fingers 314, 315 via contact pads 346, 347, respectively, which are shown in FIG. 4c. Contact electrodes 313' are connected to ground. The resulting electric field lines 309' 310' in NLO layer 311 are shown in FIG. 4d.

The advantage of MZ modulator embodiment 300' over embodiment 300 is that the drive voltages are considerably lower for the former embodiment compared to the later. This is a consequence of the fact that the fringe field factor $\rho$ is unity for embodiment 300' whereas it is considerably less than unity for embodiment 300 (see Equation (17)). On the other hand, the disadvantage of embodiment 300' is that this embodiment is likely to exhibit far more optical propagation loss than embodiment 300 due to the fact that the transparent conductor is in contact with the channel waveguides.

Figure 5A:
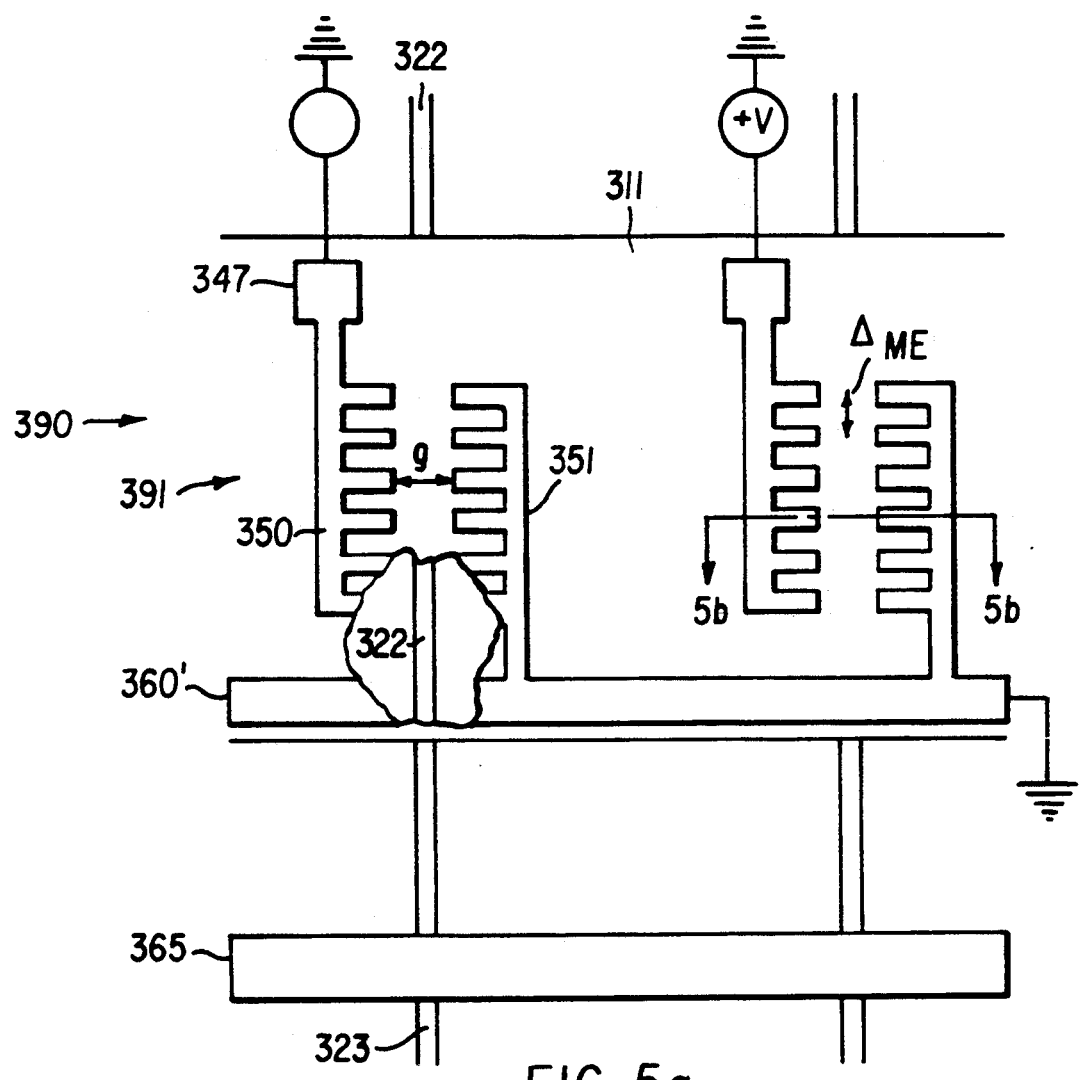
FIG. 5a illustrates a different type of waveguide modulator than the MZ modulator shown in FIGS. 2–4.
Figure 5B:
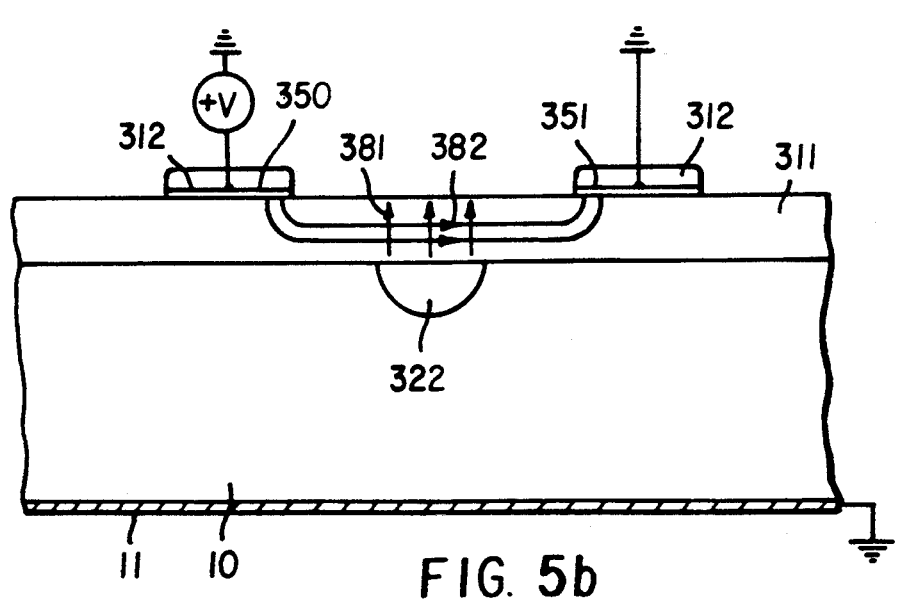
FIG. 5b is a sectional view taken along line Vb—Vb of FIG. 5a, but illustrating another embodiment.

FIGS. 5a and 5b illustrate an altogether different type of waveguide modulator from the MZ modulator described previously. This so-called converter modulator, reference numeral 390, represents yet another embodiment for the modulator section of the page scanner. This modulator is based on TM-TE conversion and works in the following manner. Referring to FIG. 5a, light that is diffracted from the primary channel waveguide into secondary side channel waveguide 322 is TM polarized. TM-TE converter 391 causes light to be converted from the incident TM polarization to TE polarization when an appropriate drive voltage is applied between finger electrodes 350 and 351. Light exiting the converter then passes beneath a metal absorber film 365 which absorbs TM polarized light far more than it does TE polarized light. Thus when no drive voltage is applied, no conversion is effected and only a small amount of light propagates in output channel waveguide 323. The converter modulator is said to be in the "off" state. Conversely, when a drive voltage is applied, TM-TE conversion occurs and a relatively large amount of light propagates in output channel waveguide 323. In this case the modulator is in the "on" state.

Referring to FIG. 5a secondary side channel waveguide 322 passes beneath NLO layer 311 in region defining the TM-TE converter 391. Finger electrodes 350, 351 are formed atop the NLO layer on either side of secondary side channel 322 as shown schematically in the cutaway of FIG. 5a. Drive voltage $+V$ is applied to finger electrode 350 via contact pad 347 and ground contact is made to finger electrode 351 via bus bar 360'. Secondary side channel 322 emerges from beneath NLO layer 311 on the output side of TM-TE converter 391 and passes beneath metal absorber band 365.

FIG. 5b shows a cross-section through sectional line Vb—Vb of FIG. 5a. Reference numeral 381 refers to the direction of poling of the NLO layer in the region proximate to channel waveguide 322. Means of poling will be described later. Reference number 382 refers to the direction of the electric fringing field lines which result from drive voltage V being applied between periodic finger electrodes 350 and 351. Electric fringing filed lines 381 are perpendicular to poling direction 381. Reference numeral 312 refers to the resist which covers the metal electrodes and prevents dielectric breakdown when voltages are applied. Reference numeral 11 refers to the ground plane on the bottom of substrate 10 which is used only during the poling process.

The theory of TM-TE coupling in nonlinear optic media is known in the literature (see, for example, *Coupled-Mode Theory for Guided-Wave Optics*, A. Yariv, IEEE Journal of Quantum Electronic, Vol. QE-9, Set. 1973, pp 919-933). The use of nonlinear optic organic material for TM-TE conversion is new to the art. TM-TE coupling occurs by virtue of the applied electric field being at right angles to the poling direction of the NLO material so that advantage may be taken of the $r_{51}$ linear electro-optic coefficient of the NLO material. The pitch, $\Lambda_{ME}$, of the periodic electrode fingers 350, 351 (see FIG. 5a) is such that quasi-phase matching is obtained between the TM and TE modes propagating in channel waveguide 322. This pitch is given by the formula $$\Lambda_{ME} = \frac{\lambda}{N_{TE} - N_{TM}} \quad (18)$$

where all quantities are as defined previously. The length of the TM-TE converter for 100% conversion efficiency is given by the relationship $$L_{ME} = \frac{\pi \lambda}{N_{TM} n_{NLO}^2 r_{51} \gamma_{ME}^E} \quad (19)$$

where $$\gamma_{ME} = \int_0^d H_y^{TM}(x) E_y^{TE}(x) dx$$

and $$E = \rho \frac{V}{g}.$$

$\gamma_{ME}$ is the overlap integral between the y-component of the TM optical field distribution and the y-component of the TE optical field distribution. These fields are normalized to unity power. The y-direction is taken to be perpendicular to the propagation direction and parallel to the substrate surface. The integration is over the thickness of the NLO film and, as before, x is the coordinate measured in the direction perpendicular to the substrate surface from the interface of the NLO layer and the substrate. Here again, $n_{NLO}$ and $r_{51}$ are the index of refraction and linear electro-optic coefficient to the NLO material, respectively. E is the magnitude of the electric fringing field in the NLO layer adjacent to the channel waveguide 322 and g is the separation between the periodic electrode fingers 350 and 351 (see FIG. 5a). The factor $\rho$ accounts for the fact that the electric field is a fringing field between the periodic fingers of electrodes 350 and 351 (see FIG. 5b). In this embodiment, the electric fringing fields proximate to channel waveguide 322 are parallel to the plane of the electrodes. In this case ρ is close to unity.

To estimate the electrode pitch, $\Lambda_{ME}$, and the device length, $L_{ME}$, required for a given voltage, channel waveguide 322 is approximated by a planar waveguide. Furthermore, in order to approximate the effects of birefringence in the poled NLO material, it is assumed that the cover index $n_c$ is equal to $n_o$, the ordinary index of the poled NLO material, for computation of $N_{TE}$. $n_c$ is taken to be equal to $n_e$, the extra-ordinary index of the poled NLO material, for the computation of $N_{TM}$. Using the following values for the various parameters $n_f = 1.64$ (20)

$n_s = 1.60$ $n_o = 1.625$ $n_e = 1.63$ $\lambda = 0.83\ \mu m$ $h_o = 1.0\ \mu m$ $r_{51} = 10\ pm/V$ $E = 3\ V/\mu m$ values of $N_{TM} = 1.630587$, $N_{TE} = 1.628280$, and $\gamma_{ME} = 0.891$ are obtained. Substituting these values into Equations (18) and (19) yields $\Lambda_{ME} = 360\ \mu m$ and $L_{ME} = 2.26$. The voltage required to obtain a fringing field of $E = 3\ V/\mu m$, assuming $g = 10\ \mu m$ and $\rho = 1$, is 30 volts.

As mentioned previously, light guided in waveguide channel 322 exiting TM-TE converter 391 is absorbed differently by metal film 365 depending on its polarization. The contrast ratio of the modulator can be determined by calculating the imaginary parts of the propagation coefficient for the TE (on-state) and the TM (off-state) modes. Again assuming a planar slab waveguide approximation to the ion-exchanged channel waveguide and assuming values for $n_s$, $n_f$, and $h_o$ as given in Equations (19), the losses for the TM and TE modes can be computed for a 0.05 μm thick gold layer in air ($n_c = 1$). The TE mode has a loss coefficient of 16.7 dB/cm whereas the TM mode exhibits a loss coefficient of 191 dB/cm. For a 1 mm long absorber, the contrast ratio is 17.4 dB.

One possible means of poling for the converter modulator is described as follows. After the channel waveguides and T-branch gratings have been fabricated, a conductive metal film such as aluminum or Cr/Au is evaporated onto the bottom surface of substrate 10. The NLO polymer is then spin-coated on the surface of substrate that has the channel waveguides. The metal film is then grounded and the sample is heated to just below the glass transition temperature of the NLO material. A corona discharge wire which is charged to several thousand volts potential is passed over the surface of the NLO film. Corona discharge generates a positive electrostatic potential on the surface of the NLO relative to the ground plane. This sets up an electric field in the NLO, the presence of which causes the NLO film to be poled in those regions proximate to ground plane. Following the corona poling process, the film is cooled to ambient temperature. A metal film is then evaporated onto the top surface of the NLO film, followed by photolithographic processing to generate the surface electrode pattern already described in conjunction with FIG. 5a.

The intensity of light in each secondary side channel waveguide is electro-optically modulated according to pixel information electronically fed to each modulator. However, the diameter of the guided mode in each secondary side channel is such that beamlets exiting the secondary channel waveguide diffract as the beamlet propagates towards the photoreceptor. If the photoreceptor is too far from the output face of the page scanner, the beamlets will overlap at the photoreceptor surface. Each point on the photoreceptor would then be exposed to multiple beamlets and the information imposed on the array of beamlets would become scrambled. On the other hand, it is undesirable to have the spacing between the end face of the page scanner and the surface of the photoreceptor so small that debris from the photoreceptor (i.e., toner particles) or photoreceptor runout can cause problems. The expansion of the beamlet diameter is related to the separation, z, between the page scanner and the photoreceptor surface according to the following equation:

$$z = \frac{\pi w_o^2}{4\lambda} \sqrt{\frac{w_z^2}{w_o^2} - 1} \quad (21)$$

where $w_o$ and $w_z$ are the 1/e diameters of the beamlet at the end face of the page scanner and the photoreceptor surface, respectively, and λ is the wavelength of light. Eqn. 21 shows that the smaller the diameter of the beamlet exiting the secondary channel waveguide the smaller the separation between the page scanner and the photoreceptor must be for a given degree of beamlet overlap. For example, if $w_o$ is assumed to be 40 μm and $w_z$ is taken to be 60 μm, a separation of 1.7 mm is obtained from Eqn. 1 for a wavelength of 0.83 μm. This situation corresponds to a 10 μm beamlet overlap at the photoreceptor surface and a pixel spacing of 50 μm.

Figure 6A:
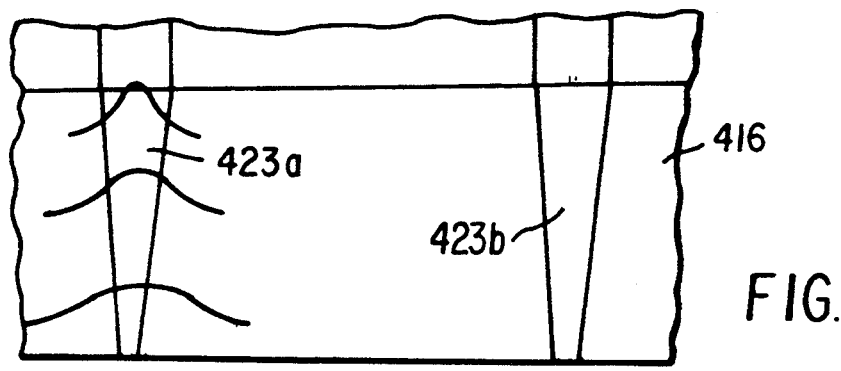
FIG. 6a is a detailed plan view of tapered output coupler.
Figure 6B:
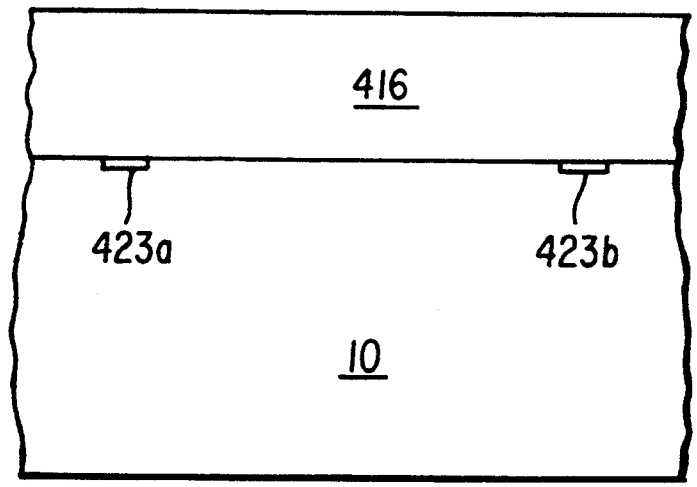
FIG. 6b is a detailed view of the endface page scanner.

A difficulty arises from the fact that the mode size of a typical single mode channel waveguide is on the order of 5 μm. Since the required beamlet diameter is on the order of 40 μm, a means must be provided whereby the mode size can be increased about an order of magnitude before it exits the secondary side channel at the endface of the page scanner. Such a means is illustrated in FIGS. 6a and 6b. FIG. 6a shows a detailed plan view of tapered output coupler 423 and FIG. 6b shows a detailed view of the endface of the page scanner. It is well known that symmetric channel waveguides can be made arbitrarily narrow and still guide light. Symmetric waveguides are those in which the index of refraction of media surrounding the waveguide core is the same in all directions from the core. It is also well known that the guided mode size of a symmetric channel waveguide increases indefinitely as the channel dimensions decrease. Hence by adiabatically tapering the lateral dimensions of the secondary channel waveguide and coating the edge of substrate 10 with a transparent medium 416, the index of refraction of which matches that of the substrate, it should be possible to cause the mode profile of the guided mode to increase to the desired size before exiting the page scanner. This is shown schematically on the left hand side of FIG. 6a. The transparent index matching film should be from 2 microns to 2 millimeters in thickness, preferable 0.5 to 1 mm, and could be an organic polymer such as polymethylmethacrylate, polystyrene, or polybromostyrene. This film could also be made of copolymers of these materials such that the index of the copolymer equals the index of the substrate. It will also be appreciated that the polymer cover layer 416 could be made to extend over the electrodes of the modulator section 300 so as to provide an environmental protective cover to this section as well as to prevent dielectric breakdown when voltages are applied to these electrodes.

The taper 423 of the secondary side channel waveguide could be formed by modifying the metal exchange mask. For example, consider a metal exchange mask with an opening that varies from 3 microns down to 0.5 microns. If the silver nitrate ion-exchange bath is held at 340 degrees Celsius and a BK-7 substrate with such a mask is placed in the bath for 10 minutes, the diffusion depth will be 1 micron. The wider portion of the mask would generate a waveguide that is 5 microns wide and one micron deep yielding an optical mode profile approximately 5 microns in diameter. On the other hand, the more narrow portion of the mask should generate a channel waveguide that is 2.5 microns in width and one micron deep with a mode profile that is nearly 40 microns in diameter.

Figure 6C:
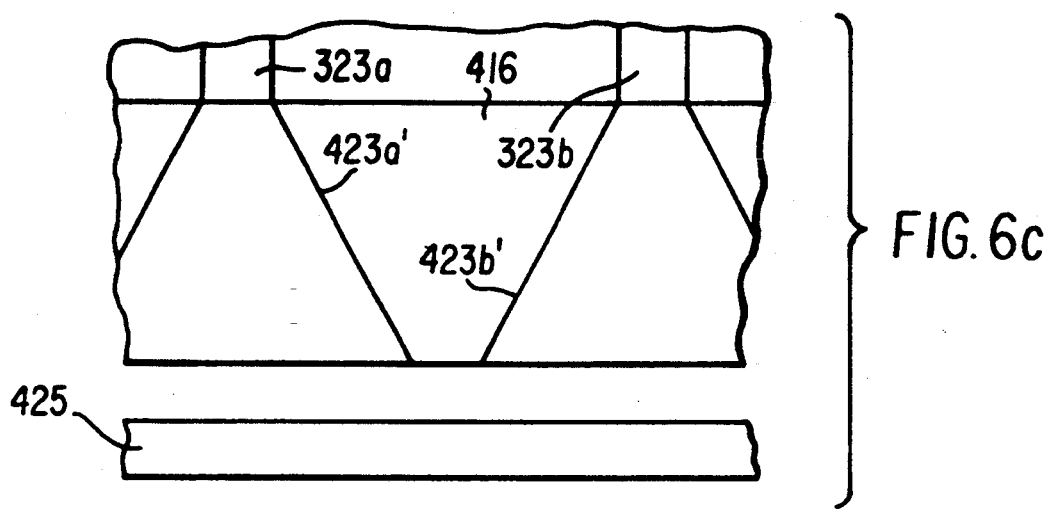
FIG. 6c is a detailed plan view of an expanded output coupler.
Figure 6D:
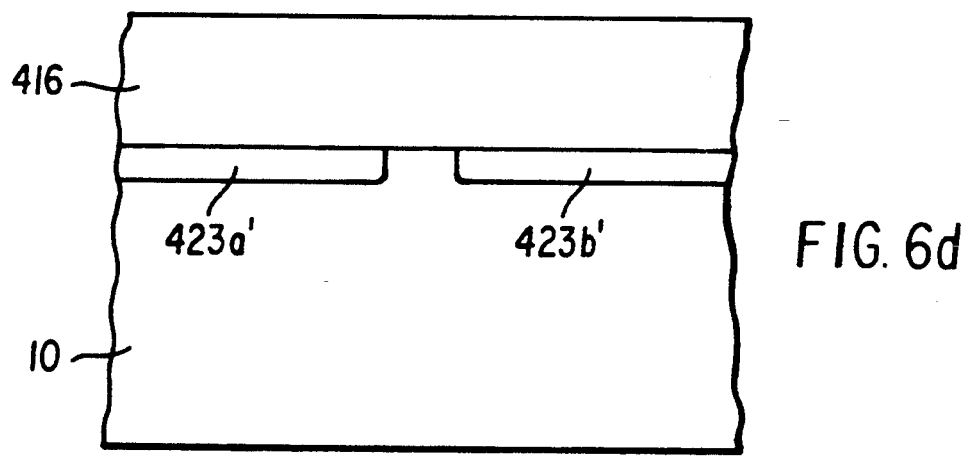
FIG. 6d is an end view of expanded waveguide channel output coupler.

An alternative means of obtaining expanded beamlet waists at the output of the secondary side channels is to form output couplers 423' as illustrated in FIGS. 6c and 6d. In FIG. 6c, a detailed plan view of an expanded output coupler is shown. In this embodiment, the guided mode profile present in channel 323 is expanded adiabatically by expanding the width of the channel. Although the expanded waveguide channel width will result in multiple transverse guided modes, the guided light will remain primarily in the m=0 mode if the channel width is expanded adiabatically. FIG. 6d shows an end view of substrate 10 and expanded waveguide channel output coupler 423'.

If the width of channel waveguide 423' is expanded so that the extent of the waveguide channel is much greater than the depth of the channel, the intensity distribution of the output beamlet will diffract more in the meridian perpendicular to the plane of the surface of substrate 10 than it will in the meridian parallel to the plane substrate. This would be the case, for example, if coupler 423' were to be made 40 microns wide at the output while the channel depth were to be maintained at one micron. In such a circumstance, the output beamlet is said to be anamorphic which is a highly undesirable condition. The anamorphic nature of the output beamlet is diminished somewhat by the addition of cover layer 416 since the presence of this layer causes the effective depth of the guided mode to increase. Cover film 416 can be formed of a transparent material, the index of which should match the index of substrate 10 as described previously with respect to the embodiment illustrated in FIG. 6a. Also shown in FIGS. 6c and 6d is cylinder lens 425. This cylinder lens collimates the light radiating from output coupler 423' in the more divergent meridian without affecting the divergence properties of the light in the meridian parallel to the plane of the substrate surface. Cylinder lens 425 can be of very simple construction. For example, a 0.25 to 1 mm diameter plastic or glass rod placed one focal length away from the output endface of substrate 10 with the length of the rod extending along and parallel to the output face would serve as a suitable cylinder lens.

Figure 6E:
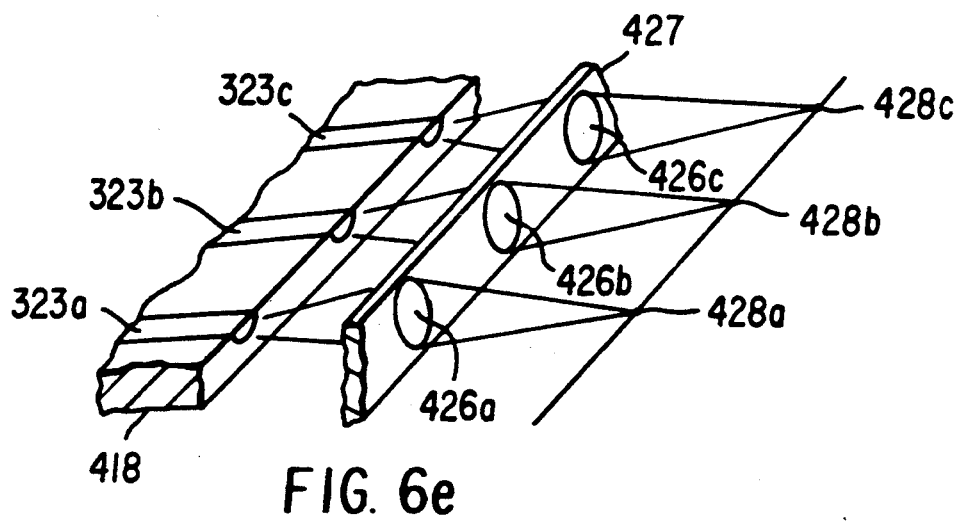
FIG. 6e is a diagrammatic isomorphic view of the endface of the page scanner and a microlens array which is used to image the output light from the secondary waveguide channels onto the photoreceptor surface.

FIG. 6e illustrates yet another alternative output coupling scheme for the page scanner device. In this embodiment, secondary side channel waveguides 323a, 323b, . . . , 323n terminate at polished endface 418. Light which radiates out from each of these channel waveguides is collected and imaged onto the surface of the photoreceptor at points 428a, 428b, . . . , 428n by lens array 427. Lens array 427 is composed of a multiplicity of individual lenses 426a, 426b, . . . , 426n which are aligned with the corresponding secondary side channel waveguides 323a, 323b, . . . , 323n. Such microlens arrays are well known. (see, for example, *Distributed-Index Planar Microlens and Stacked Planar Optics: A Review of Progress*, K. Iga and S. Misawa, Applied Optics, Vol 25. No. 19. 1 Oct., 1986, pp 3388–3396).

Figure 8:
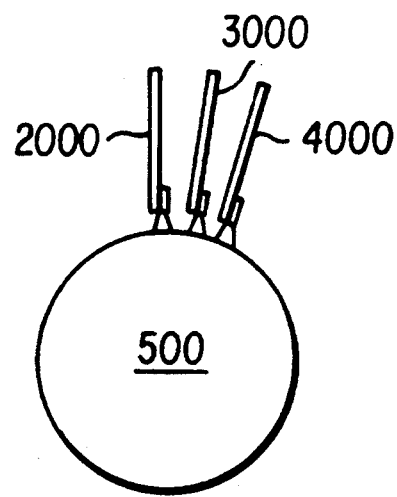
FIG. 8 is a diagram illustrating combining several full width page scanners to write multiple lines of data simultaneously on a photoreceptor.
Figure 7:
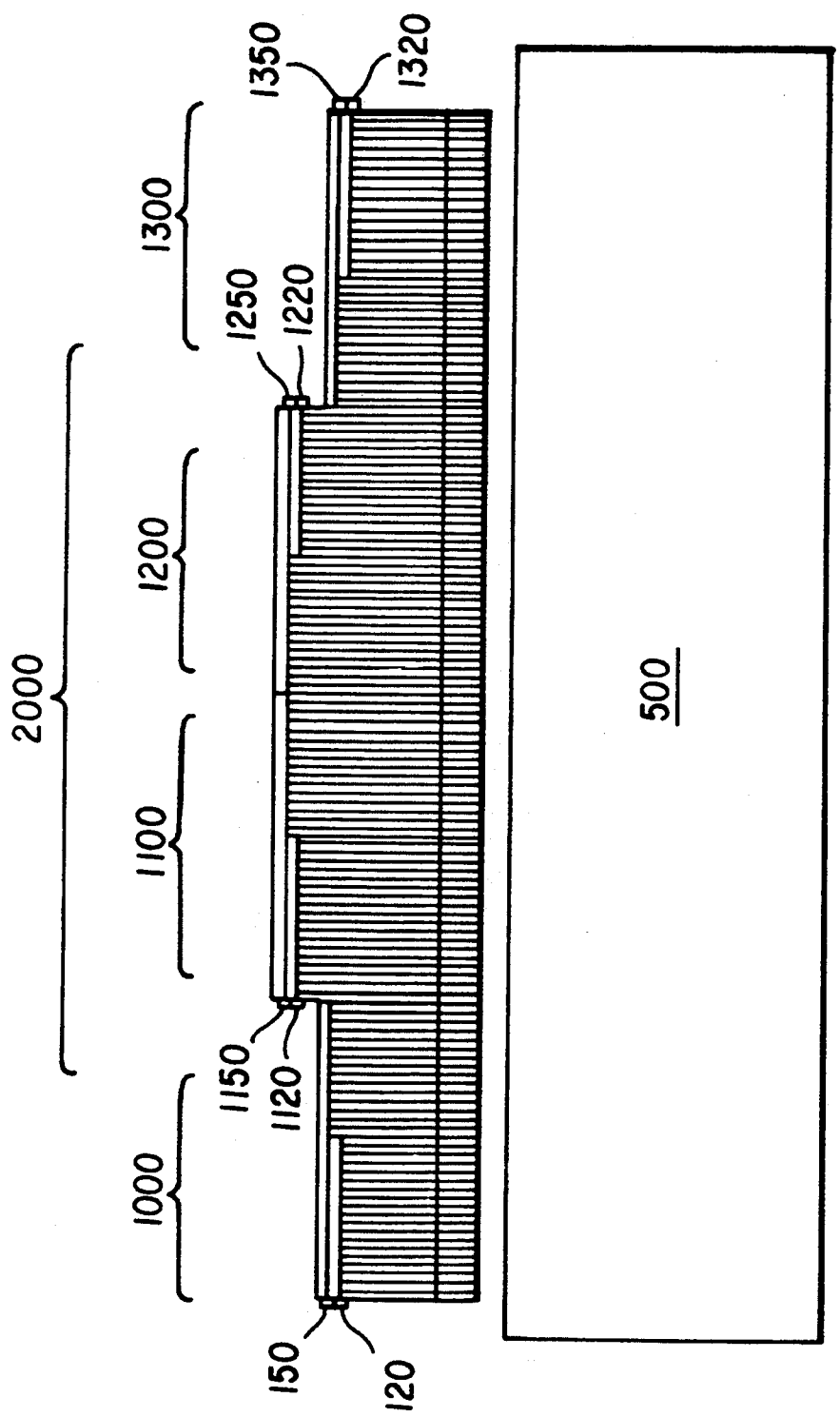
FIG. 7 illustrates a full-width page scanner formed by joining together multiple page scanner plates.

FIG. 7 illustrates a full-width page scanner 2000 formed by joining together multiple page scanner plates 1000, 1100, 1200, 1300. In this manner, plates of smaller size can be combined to make the overall page scanner width as large as desired. FIG. 8 illustrates a means by which several full-width page scanners 2000, 3000, 4000 can be used to write multiple lines simultaneously on photoreceptor 500.

One final consideration is the optical power required to operate such a page scanner. Typical photoreceptors require on the order to 10 ergs/cm$^2$ for exposure. Assuming a page size of 25 cm by 20 cm and a printing rate of 1 page per second, the required optical power is 0.5 mW, assuming no losses in the system. It is reasonable to assume about 3 dB input coupling loss and 2 dB loss due to light remaining in the primary channel at the end of the page scanner. Furthermore, an assumed loss rate of 1 dB/cm due to combined propagation losses and excess scattering losses at the branches yields an average of loss of 10 dB (i.e., the average path length for all pixels is about 10 cm). Consequently the net loss can be estimated to be about 15 dB which corresponds to a 97% reduction of the incident power. If 0.5 mW of optical power is required at the photoreceptor, the input optical power must be 15 mW. This is well within the capabilities of most commercially available laser diodes. Note that this estimation is based on the use of a single laser diode for a page scanner 20 cm wide. Correspondingly lower power requirements per laser diode would be required for shorter page scanner segments such as illustrated in FIG. 7.

It can now be appreciated that there has been presented a multichannel optical waveguide page scanner with individually addressable electro-optic modulators. The page scanner comprises a diode laser, a substrate having an index of refraction, a primary optical channel waveguide formed on the substrate, means for coupling light from the diode into the primary channel waveguide, multiple secondary side channels formed on the substrate each having a thin-film electro-optic waveguide modulator formed therein, a series of T-branch connectors formed on the substrate and distributing light from the primary channel to the secondary side channels, and means for electrically addressing each of the electro-optic waveguide modulators.

The primary optical channel waveguide may have a main section and a widened section tapering down adiabatically to join the main section. By adiabatically tapering the lateral dimensions of the secondary channel waveguide and coating the edge of substrate with a transparent medium, the index of refraction of which matches that of the substrate, it is possible to cause the mode profile of the guided mode to increase to the desired size before exiting the page scanner.

Multiple secondary side channels formed on the substrate each have a first single mode secondary side channel divided into separate first and second single mode channel waveguides at a first Y-branch and recombined at a second Y-branch to form a second single mode channel waveguide. The MZ interferometer modulator section is defined by the first and second Y-branches and the first and second waveguide channels.

One of the chief advantages of the current invention is that it requires no expensive, bulky lenses to transfer the pixel illumination pattern to the photoreceptor surface. The fact that light is confined to narrow channel waveguides makes the device extremely compact and enables electro-optic modulation with relatively low drive voltages. Drive voltages are further reduced when organic materials with large electro-optic coefficients are used. The page scanner substrates are thin enough that several can be stacked to write multiple lines simultaneously on the photo-receptor. Another advantage is that this device is made of relatively inexpensive materials such as glass and LB-, spin-, or dip- coated nonlinear optic organic polymers. This advantage enables the fabrication of inexpensive wide arrays. Finally, the fact that these page scanners are planar devices means that planar IC processing techniques can be used to mass produce them. This together with the fact that labor intensive alignment and assembly fabrication procedures can be nearly eliminated further reduce the unit manufacturing cost.

While the invention has been described with particular reference to the preferred embodiments, it will be understood by those skilled in the art that various changes may be made and equivalents may be substituted for elements of the preferred embodiments without departing from invention. There are many other applications for such a device other than electrophotographic printing. For example, the device could be used in reverse to scan an image in a line-wise fashion. In this application, light reflected from a document would be captured by the array of secondary side channel waveguides 323 and fed back to the primary channel waveguide. The modulators 300 would be used to gate the light in such a way that a single photo-detector placed at the beginning of the primary channel (i.e., replacing laser diode 150) could be used to detect the reflected light levels from the individual secondary side channels in sequence. Another application would be to use the device as an "optical rail" or "optical bus" in a local area network (LAN) system. Such a device would be used to distribute information to selected output ports along a linear distribution network. A third application would be to use the device as a wavelength division demultiplexer-multiplexer. In this application, the pitches of successive T-branch gratings would be made differently so that different wavelengths could be directed down different secondary side channels from the primary channel waveguide and vice-versa. In this way, a signal comprised of multiple wavelengths of light could be separated into the separate individual wavelength components (i.e., demultiplexing function). Alternatively, multiple wavelengths could be modulated individually in each of the secondary side channel waveguides and inserted onto the primary channel waveguide (i.e., multiplexing function). In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A page scanner, comprising:
   a diode laser;
   a substrate having an index of refraction;
   a primary optical channel waveguide formed on said substrate;
   means for coupling light from said diode into said primary channel waveguide;
   multiple secondary side channels formed on said substrate each having a thin-film electro-optic waveguide modulator formed therein;
   a series of T-branch connectors formed on said substrate and distributing light in parallel from said primary channel to said secondary side channels; and
   means for electrically addressing each of said electro-optic waveguide modulators.

2. A page scanner, as set forth in claim 1, wherein said means for electrically addressing each modulator includes thin-film transistors formed on said substrate supporting said channel waveguides.

3. A page scanner, as set forth in claim 1, wherein channel waveguide terminations are designed so that exiting light forms a one dimensional array of beamlets.

4. A page scanner, as set forth in claim 3, wherein divergence of said beamlets is small enough that overlap of adjacent pixels is minimum at a photoreceptor plane.

5. A page scanner, as set forth in claim t, wherein said electro-optic modulators are addressable individually.

6. A page scanner, as set forth in claim 1, wherein said electro-optic modulators gate so that a single photodetector placed at a beginning of said primary channel sequentially detects reflected light levels from individual secondary side channels.

7. A page scanner, as set forth in claim 1, wherein each T-branch connector has a grating with a grating pitch with pitches of successive T-branch gratings being different so that different wavelengths of light can be directed from said primary channel along different secondary side channels and from said secondary channels into said primary channel.

8. A page scanner, as set forth in claim 1, wherein light from said diode laser is coupled into an optical fiber and said optical fiber is endfire-coupled into said primary channel waveguide.

9. A page scanner, as set forth in claim 1, including a collimating lens for receiving and collimating light from said laser diode.

10. A page scanner, as set forth in claim 1, wherein said primary channel waveguide has a main section and a widened section.

11. A page scanner, as set forth in claim 10, including a blazed grating coupler, said laser being oriented so that TE polarized light from said laser is coupled into said widened channel waveguide section by said blazed grating coupler.

12. A page scanner, as set forth in claim 10, wherein said widened channel waveguide section tapers down adiabatically to join said main section of said primary channel waveguide.

13. A page scanner, as set forth in claim 1, wherein each T-branch connector in said series of T-branch connectors is spaced a preselected distance from an adjacent T-branch connector, each T-branch connector coupling an amount of light into an associated secondary side channel.

14. A page scanner, as set forth in claim 13, wherein a page to be scanned has pixels with a desired pixel spacing and said preselected distance between adjacent T-branch connectors is equal to the desired pixel spacing.

15. A page scanner, as set forth in claim 13 wherein the amount of light in each secondary side channel is approximately the same.

16. A page scanner, as set forth in claim 1, wherein coupling strengths of said T-branch couplers become progressively larger as distance from said laser diode increases.

17. A page scanner, as set forth in claim 1, wherein said T-branch couplers convert TE polarized light in said primary channel waveguide to TM polarized light in said secondary side channels.

18. A page scanner, as set forth in claim 1, wherein secondary channel waveguides on an output side of the modulators terminate in tapered output couplers.

19. A page scanner, as set forth in claim 18, including a cover medium extending a full length of the page scanner, said cover medium having an index of refraction that matches said index of refraction of said substrate.

20. A page scanner, as set forth in claim 19, wherein said page scanner has an output face, said secondary channel waveguides are single mode waveguides, and the tapered output couplers and the index-matching cover medium function to cause the guided modes in the single mode secondary channel waveguides to expand adiabatically before exiting the output face of the page scanner.

21. A page scanner, as set forth in claim 1, including T-branch grating coupling couplers wherein depth of successive T-branch couplers is varied so that optical power coupled into each secondary side channel waveguide is identical.

22. A page scanner, comprising:
a diode laser;
a substrate having an index of refraction;
a primary optical channel waveguide having a main section and a widened section tapering down adiabatically to join said main section;
means for coupling light from said diode into said primary channel waveguide;
multiple secondary side channels formed on said substrate each having a first single mode secondary side channel dividing into separate first and second single mode channel waveguides at a first Y-branch and recombining at a second Y-branch to form a second single mode channel waveguide, each of said first and second waveguides having a width;
an MZ interferometer section defined by said first and second Y-branches and said first and second waveguide channels; and
a series of T-branch connectors formed on said substrate for distributing light in parallel from said primary channel to said secondary side channels.

23. A page scanner, as set forth in claim 22, including a layer of an NLO material covering said MZ interferometer section.

24. A page scanner, as set forth in claim 22, wherein first and second electrodes are connected to first and second contact pads, respectively, for connection to preselected drive voltages.

25. A page scanner, as set forth in claim 22, including a finger electrode connected to ground via a bus bar.

26. A page scanner, as set forth in claim 22, wherein expansion of a beamlet diameter is related to separation, z, between the page scanner and a photoreceptor surface such that a diameter of the guided mode in each secondary side channel is such that beamlets exiting the secondary channel waveguide diffract as the beamlets propagate toward the photoreceptor.

27. A page scanner, as set forth in claim 22, wherein expansion of a beamlet diameter is directly related to separation, z, between the page scanner and a photoreceptor surface such that the larger the diameter of the beamlet exiting the secondary channel waveguide the larger the separation between the page scanner and the photoreceptor for a given degree of beamlet overlap.

28. A page scanner, as set forth in claim 22, including a thin-film electro-optic waveguide modulator formed on each of said multiple secondary side channels, said modulators gating light such that a single photodetector placed at a beginning of the primary channel detects reflected light levels from individual secondary side channels in sequence.

29. A page scanner, comprising:
a diode laser;
a substrate having an index of refraction;
a primary optical channel waveguide formed on said substrate;
means for coupling light from said diode into said primary channel waveguide;
multiple secondary side channels formed on said substrate each having a thin-film electro-optic waveguide modulator formed therein;
a series of T-branch connectors formed on said substrate and distributing light from said primary channel to said secondary side channels, each T-branch connector having a grating with a grating pitch with pitches of successive T-branch gratings being different so that a signal having multiple wavelengths can be directed in parallel along different secondary side channels; and
means for electrically addressing each of said electro-optic waveguide modulators.

30. A page scanner, as set forth in claim 29, wherein a signal having multiple wavelengths of light is separated into separate individual wavelength components.

31. A page scanner, as set forth in claim 29, wherein multiple wavelengths are modulated individually in each second side channel waveguide and inserted into the primary channel waveguide.

* * * * *